United States Patent
Fitzek et al.

(10) Patent No.: US 10,028,198 B2
(45) Date of Patent: Jul. 17, 2018

(54) METHOD AND APPARATUS TO ENHANCE ROUTING PROTOCOLS IN WIRELESS MESH NETWORKS

(71) Applicant: Aalborg Universitet, Aalborg (DK)

(72) Inventors: Frank H. P. Fitzek, Berlin (DE); Daniel E. Lucani, Hobro (DK); Peyman Pahlevani, Aalborg (DK)

(73) Assignee: Aalborg Universitet, Aalborg (DK)

( * ) Notice: Subject to any disclaimer, the term of this patent is extended or adjusted under 35 U.S.C. 154(b) by 32 days.

(21) Appl. No.: 14/775,102

(22) PCT Filed: Mar. 12, 2014

(86) PCT No.: PCT/US2014/024450
§ 371 (c)(1),
(2) Date: Sep. 11, 2015

(87) PCT Pub. No.: WO2014/159616
PCT Pub. Date: Oct. 2, 2014

(65) Prior Publication Data
US 2016/0021599 A1    Jan. 21, 2016

Related U.S. Application Data

(60) Provisional application No. 61/783,832, filed on Mar. 14, 2013.

(51) Int. Cl.
*H04W 40/12* (2009.01)
*H04L 12/64* (2006.01)
(Continued)

(52) U.S. Cl.
CPC ......... *H04W 40/12* (2013.01); *H04L 12/6418* (2013.01); *H04W 40/248* (2013.01); *H04W 84/18* (2013.01)

(58) Field of Classification Search
CPC ... H04W 84/18; H04W 40/248; H04W 40/12; H04L 12/6418
See application file for complete search history.

(56) References Cited

U.S. PATENT DOCUMENTS

| 7,408,938 | B1 | 8/2008 | Chou et al. |
| 2005/0232183 | A1* | 10/2005 | Sartori ............... H04B 7/15542 370/319 |

(Continued)

FOREIGN PATENT DOCUMENTS

| WO | WO 2010/025362 A2 | 3/2010 |
| WO | WO 2014/134276 A1 | 9/2014 |

OTHER PUBLICATIONS

PCT International Preliminary Report dated Sep. 11, 2015 corresponding to International Application No. PCT/US2014/018933; 8 Pages.
(Continued)

*Primary Examiner* — Omer S Mian
(74) *Attorney, Agent, or Firm* — Daly, Crowley, Mofford & Durkee, LLP

(57) ABSTRACT

A protocol for use in wireless mesh networks (PlayNCool) uses helper nodes to improve data flow in the network. The protocol is compatible with traditional mesh network routing algorithms. Techniques, systems, devices, and circuits for implementing the protocol are described.

19 Claims, 15 Drawing Sheets

(51) Int. Cl.
*H04W 40/24* (2009.01)
*H04W 84/18* (2009.01)

(56) References Cited

U.S. PATENT DOCUMENTS

| | | |
|---|---|---|
| 2008/0130521 A1 | 6/2008 | Li et al. |
| 2008/0219251 A1 | 9/2008 | Xue et al. |
| 2008/0267106 A1 | 10/2008 | Buddhikot et al. |
| 2009/0323580 A1 | 12/2009 | Xue et al. |
| 2010/0046371 A1 | 2/2010 | Sundararajan et al. |
| 2010/0226243 A1 | 9/2010 | Lee et al. |
| 2011/0164621 A1 | 7/2011 | Lee et al. |
| 2012/0155531 A1 | 6/2012 | Yi et al. |
| 2012/0188934 A1 | 7/2012 | Liu et al. |
| 2012/0250494 A1 | 10/2012 | Rong et al. |
| 2013/0051377 A1 | 2/2013 | Seferoglu et al. |
| 2013/0148563 A1 | 6/2013 | Brueck et al. |
| 2014/0064296 A1 | 3/2014 | Haeupler et al. |
| 2014/0241404 A1 | 8/2014 | Liew et al. |
| 2015/0181559 A1 | 6/2015 | Medard et al. |
| 2015/0358118 A1 | 12/2015 | Krigslund et al. |

OTHER PUBLICATIONS

Extended European Search Report dated Aug. 4, 2016 corresponding to European Application No. 14756767.1; 12 Pages.

Chi et al., "A More Efficient COPE Architecture for Network Coding in Multihop Wireless Networks;" XP-001547522; Paper from the Institute of Electronics, Information and Communication Engineers (IEICE)—Transactions on Communications, vol. E92-B, No. 3; Mar. 2009; pp. 766-775; 10 Pages.

Hansen et al., "Bridging Inter-flow and Intra-flow Network Coding for Video Applications: Testbed Description and Performance Evaluation;" Proceedings of the 18$^{th}$ IEEE International Workshop on Computer Aided Modeling and Design of Communication Links and Networks (CAMAD); Sep. 25-27, 2013; 6 Pages.

U.S. Non-Final Office Action dated Nov. 29, 2016 corresponding to U.S. Appl. No. 14/647,611; 17 Pages.

Response to U.S. Non-Final Office Action dated Nov. 29, 2016 corresponding to U.S. Appl. No. 14/647,611; Response filed on Feb. 28, 2017; 12 Pages.

PCT Extended European Search Report for EP Application No. 14774611.9 dated Oct. 17, 2016; 9 Pages.

Kokalj-Filipovic et al., "Doped Fountain Coding for Minimum Delay Data Collection in Circular Networks;" Cornell University Online Library arxiv.org; Jan. 21, 2010; 45 Pages.

Pahlevani et al., "PlayNCool: Opportunistic Network Coding for Local Optimization of Routing in Wireless Mesh Networks;" Globecom 2013 Workshop—First International Workshop on Cloud-Processing in Heterogeneous Mobile Communication Networks; Dec. 13, 2013; 6 Pages.

Pahlevani et al., "Network Coding to Enhance Standard Routing Protocols in Wireless Mesh Networks;" Globecom 2013 Workshop—International Workshop on Device-to-Device (D2D) Communication With and Without Infrastructure; Dec. 13, 2013; 7 Pages.

Response (with Amended Claims and Specifications) to European Office Action dated Aug. 23, 2016 for European Application No. 14756767.1; Response filed on Mar. 1, 2017; 16 Pages.

PCT International Preliminary Report on Patentability dated Sep. 24, 2015; For PCT App. No. PCT/US2014/024450; 9 pages.

Lun et al., "On Coding for Reliable Communication Over Packet Networks;" Elsevier, ScienceDirect, Physical Communication vol. 1; Jan. 2008; 18 Pages.

Sundararajan et al., "ARQ for Network Coding;" Proceedings of the IEEE International Symposium on Information Theory; Jul. 6-11, 2008; 5 Pages.

PCT Search Report and Written Opinion dated Sep. 11, 2014; for PCT Appl. No. PCT/US14/24450; 12 pages.

Katti, et al.; "XORs in the Air: Practical Wireless Network Coding;" IEEE/ACM Transactions on Networking; vol. 16; issue 4; Jun. 2008; 14 pages.

Zhao, et. al; "On analyzing and improving COPE performance;" Information Theory and Applications Workshop (ITA); Jan. 31-Feb. 5, 2010; 6 pages.

PCT Search Report of the ISA for PCT/2014/018933 dated Jun. 20, 2014.

Written Opinion of the ISA for PCT/2014/018933 dated Jun. 20, 2014.

Handebøll, et al.; "CATWOMAN: Implementation and Performance Evaluation of IEEE 802.11 based Multi-Hop Networks using Network Coding;" IEEE 76th Vehicular Tech. Conf. (VTC), Quebec City, Canada, Sep. 2012.

Neumann, et al.; "Better approach to mobile ad-hoc networking," in IETF Internet Draft., Apr. 7, 2008.

Seferoglu, et al.; "NCAPQ: Network Coding-Aware Priority Queueing for UPD Flows over COPE;" Int. Symp. on Network Coding (NetCod), Jul. 2011, pp. 1-8.

Seferoglu, et al.; "Network Coding-Aware Queue Management for TCP Flows over Coded Wireless Networks;" IEEE/ACM Transactions on Networking; vol. 22; No. 4; Aug. 2014; pp. 1297-1310.

Zhu, et al.; "C&M: A New Network Coding Scheme for Wireless Networks;" IEEE 2009 Fifth Internationai Conference on Information Assurance and Security; Aug. 2009; pp. 432-436.

Response to Extended European Search Report for EP Appl. No. 14774611.9 dated Oct. 17, 2016 as filed on Apr. 27, 2017; 11 pages.

Notice of Allowance from U.S. Appl. No. 14/647,611 dated Sep. 14, 2017; 7 Pages.

Response to Office Action dated Jun. 2, 2017 from U.S. Appl. No. 14/647,611 as filed on Aug. 28, 2017; 17 Pages.

U.S. Non-Final Office Action dated Jun. 2, 2017 for U.S. Appl. No. 14/647,611; 12 Pages.

\* cited by examiner

PlayNCool. $R_i$ transmits 6 and $H_{i+1}$ transmits 4 packets $R_i$ transmits 7 packets and $H_{i+1}$ transmits 7 packets $R_i$ transmits 8 packets and $H_{i+1}$ transmits 4 packets

METHOD AND APPARATUS TO ENHANCE ROUTING PROTOCOLS IN WIRELESS MESH NETWORKS

This application claims the benefit under 35 U.S.C. § 363 of the filing date of co-pending International Application No. PCT/US2014/024450 filed on Mar. 12, 2014, which claims priority to U.S. Provisional Patent Application No. 61/783,832 filed on Mar. 14, 2013, the teachings of which are incorporated by reference herein in their entireties.

FIELD

The subject matter described herein relates generally to wireless communication and more particularly to techniques, systems, and protocols for enhancing routing strategies in wireless mesh networks.

BACKGROUND

Traditional routing protocols in wireless mesh networks often use a single route to deliver packets from a source node to a destination node. FIG. 1A is a diagram of an exemplary wireless mesh network 10 that illustrates a traditional routing approach. As shown in FIG. 1A, a route is established from a source node (S) 12 to a destination node (D) 14 via a single path through first and second relay nodes ($R_1$ and $R_2$) 16,18 (see, e.g., "DSR: The Dynamic Source Routing Protocol for Multi-Hop Wireless Ad Hoc Networks," by Johnson et al., *Ad Hoc Networking*, Ed. C. E. Perkins Addison-Wesley, 2001, pp. 139-172; "Ad-Hoc On-Demand Distance Vector Routing," by Perkins et al., *Proceedings of the 2nd IEEE Workshop on Mobile Computing Systems and Applications*, 1997, pp. 90-100; and "Better Approach to Mobile Ad-Hoc Networking" by Neumann et al., IETF Internet Draft). The route is established by finding the best next hop for a newly arrived packet based on different criteria (e.g., number of hops, delay, etc.). More recently, multi-path routing protocols have been developed for wireless networks that rely on sharing the load between different paths (see, e.g., "An Optimized Ad-Hoc On-Demand Multipath Distance Vector (AOMDV) Routing Protocol," by Yuan et al., *Asia-Pacific Conf on Communications*, 2005). These routing approaches are similar to routing protocols used in wired networks and do not exploit the broadcast nature of the wireless medium. That is, the broadcast nature of the wireless medium enables the nodes to "overhear" packets transmitted to other nodes.

In contrast to traditional routing protocols in wireless networks, the ExOR protocol is an integrated routing and MAC technique that utilizes the cooperation between nodes using the broadcast nature of the wireless medium (see, e.g., "ExOR: Opportunistic Multi-Hop Routing for Wireless Networks," by Biswas et al., *SIGCOMM*, 2005). In the ExOR protocol, the nodes in the network need to coordinate their actions to avoid transmitting duplicate packets. In order to decrease the coordination overhead between nodes, various protocols have exploited random linear network coding (RLNC) (see, e.g., "MORE: A Network Coding Approach to Opportunistic Routing," by Chachulski et al., *SIGCOMM*, 2007; "CCACK: Efficient Network Coding Based Opportunistic Routing Through Cumulative Coded Acknowledgments," by Koutsonikolas et al., *IEEE INFOCOM*, 2010; "GeoCode: A Geo-graphic Coding-Aware Communication Protocol," by Khamfroush et al., *International IEEE Conf. on Intel. Transp. Sys.* (*ITSC*), 2011; and others). RLNC is a coding technique that allows a sender to transmit random linear combinations of a group of original packets (see, e.g., "A Random Linear Network Coding Approach to Multicast," by Ho et al., *IEEE Trans. on Inf. Theory*, vol. 52, no. 10, 2006).

The MORE protocol is an opportunistic routing protocol that implements RLNC. Each relay will store coded packets for an active generation and re-code before sending (i.e., the relay will create new linear combinations based on the contents of its buffer of coded packets). Although MORE is interesting, its impact on commercial systems may take a while to realize because it lacks compatibility with standard routing protocols and because it relies on an offline calculation of the error probability of each link. The GeoCode protocol creates multiple paths by choosing nodes that are located inside a specified geographic area (e.g., an ellipse) as relay nodes. The created paths may intersect each other at intermediate nodes which use network coding to maximize the throughput. The CCACK protocol uses a Cumulative Coded acknowledgement approach to acknowledge network coded flow to upstream nodes, where the acknowledgement feedback is resilient to packet losses. None of these protocols work well with traditional routing protocols.

There is a need for techniques, systems, and protocols that are compatible with traditional routing protocols and that are capable of taking advantage of the broadcast nature of wireless networks to improve overall performance of a network.

SUMMARY

The present disclosure relates to a locally optimized network coding protocol named PlayNCool, and associated techniques, circuits, and systems, that may be used in wireless mesh networks. The PlayNCool protocol is easy to implement and is compatible with existing routing protocols and devices. In addition, the PlayNCool protocol allows the broadcast nature of the wireless medium to be taken advantage of by allowing transmission overhearing to be actively managed. By managing overhearing, increases in both reliability and throughput can be achieved. The protocol allows a system to gain from software implemented network coding capabilities without the need for new hardware. PlayNCool can enhance network performance by: (i) choosing one or more local helpers between nodes in a path to strengthen the quality of each link, (ii) using local information to decide when and how many transmissions to allow from each helper, and (iii) using random linear network coding to increase the usefulness of each transmission from the helper(s). Tests have shown that the PlayNCool protocol is capable of increasing end-to-end throughput in a network up to four-fold over prior techniques.

Many new network coding based wireless protocols have made significant changes to prior protocols that are not compatible with traditional routing protocols. PlayNCool, on the other hand, was designed for use with traditional routing protocols. For this reason, it is believed that PlayNCool can have a significant impact (at least in the short term) by providing enhanced performance in networks using existing routing protocols in an easily implementable way. To achieve compatibility, PlayNCool chooses one or more local helpers between nodes in a network path in order to strengthen the quality of each individual link in that path. One feature of PlayNCool that contributes to its success is its ability to have a helper node wait for a period of time (i.e., play it cool) until the node has accumulated a sufficient number of received packets before beginning to transmit.

Another distinctive feature of PlayNCool is that it is aware of competition from other nodes. For example, when a network becomes congested due to other flows, the PlayNCool protocol can activate a helper node sooner, rather than later, to increase the priority of the current flow. PlayNCool may rely on local knowledge of channel conditions to determine when and how much to transmit. In some implementations, PlayNCool may use link quality information provided by one or more routing protocols (e.g., B.A.T.M.A.N., etc.) to make these determinations. Alternatively, or in addition, PlayNCool may include a link quality discovery function to estimate channel quality information. For example, a function may be provided by which channel quality is estimated locally based on transmitted and received packets.

In accordance with one aspect of the concepts, systems, circuits, and techniques described herein, a machine implemented method for use in a wireless mesh network comprises: acquiring data packets at a source node that need to be delivered to a remote destination node through the wireless mesh network; determining a unicast route through the wireless mesh network from the source node to the destination node to support a data flow for the acquired data packets; for a link between the source node and a first relay node in the unicast route, activating a helper node to assist the link in transferring data from the source node to the first relay node; generating random linear network coded (RLNC) packets at the source node for a first generation of the data flow; initiating transmission of RLNC packets from the source node to the first relay node for the first generation; overhearing and storing RLNC packets transmitted by the source node for the first generation at the helper node; re-coding overheard RLNC packets at the helper node for the first generation; after a delay, initiating transmission of re-coded RLNC packets from the helper node to the first relay node for the first generation of the data flow; and continuing to transmit RLNC packets from at least one of the source node and the helper node until the first relay node has received a sufficient number of degrees-of-freedom (DOFs) to decode the first generation of data packets.

In one embodiment, the method further comprises repeating generating, initiating transmission of RLNC packets, overhearing and storing, re-coding, initiating transmission of re-coded RLNC packets, and continuing for each subsequent generation of packets after the first generation.

In one embodiment, the method further comprises: (i) for a second link between the first relay node and a second relay node in the unicast route, activating a second helper node to assist the second link in transferring data from the first relay node to the second relay node; (ii) generating re-coded RLNC packets at the first relay node for the first generation; (iii) initiating transmission of re-coded RLNC packets from the first relay node to the second relay node for the first generation; (iv) overhearing and storing RLNC packets transmitted by the first relay node for the first generation at the second helper node; (v) re-coding overheard RLNC packets at the second helper node for the first generation; (vi) after a second delay, initiating transmission of re-coded RLNC packets from the second helper node to the second relay node for the first generation; and (vii) continuing to transmit RLNC packets from at least one of the first relay node and the second helper node until the second relay node has received a sufficient number of degrees-of-freedom (DOFs) to decode the first generation of data packets.

In one embodiment, generating re-coded RLNC packets at the first relay node for the first generation includes using a variable parameter to control timing of re-coding operations in the first relay node.

In one embodiment, the method further comprises calculating the delay of the helper node based, at least in part, on channel conditions in the wireless mesh network and/or other active users or nodes in the wireless mesh network.

In one embodiment, the delay of the helper node is expressed as a number of RLNC packets that the helper node has to overhear from the source node before initiating transmission of re-coded RLNC packets.

In one embodiment, the method further comprises estimating, at the source node, a number of RLNC packets that will need to be transmitted from the source node for the first generation, wherein generating RLNC packets includes generating the estimated number of packets.

In one embodiment, the method further comprises estimating a number of re-coded packets that will be transmitted from the helper node for the first generation.

In one embodiment, the method further comprises transmitting an ACK message from the first relay node after the first relay node has received a sufficient number of degrees-of-freedom (DOFs) to decode the first generation of data packets, wherein at least one of the source node and the helper node will cease to transmit RLNC packets for the first generation in response to the ACK message.

In one embodiment, re-coding overheard RLNC packets at the helper node for the first generation includes using a variable parameter to control timing of re-coding operations in the helper node.

In one embodiment, the method further comprises, at a helper node associated with one link in the unicast route, overhearing and storing packets transmitted by a helper node associated with another, different link in the unicast route.

In accordance with another aspect of the concepts, systems, circuits, and techniques described herein, a machine implemented method for use in a wireless mesh network comprises: (i) acquiring a group of data packets at a first wireless node for transmission to a second wireless node via a direct wireless link; (ii) activating a helper node to assist in transmission of data from the first wireless node to the second wireless node; (iii) generating random linear network coded (RLNC) packets at the first wireless node by linearly combining the group of data packets; (iv) initiating transmission of the RLNC packets from the first wireless node to the second wireless node through the direct wireless link; (v) overhearing and storing RLNC packets transmitted by the first wireless node at the helper node; (vi) re-coding RLNC packets stored within the helper node to generate re-coded RLNC packets; (vii) after a delay, initiating transmission of re-coded RLNC packets from the helper node to the second wireless node; and (viii) continuing to transmit RLNC packets from at least one of the first wireless node and the helper node until the second wireless node has received a sufficient number of degrees-of-freedom (DOFs) to decode the group of data packets.

In one embodiment, activating a helper node includes activating the helper node automatically from the helper node based on channel conditions within the network and/or other active users or nodes in the network.

In one embodiment, activating a helper node includes determining at the first wireless node that a helper node is needed and sending a request to another node in the wireless mesh network requesting that the other node serve as a helper node for the link between the first wireless node and the second wireless node.

In one embodiment, the method further comprises calculating the delay of the helper node based, at least in part, on channel conditions in the wireless mesh network.

In one embodiment, calculating the delay of the helper node is performed at either the first wireless node or the helper node.

In one embodiment, the delay of the helper node is expressed as a number of RLNC packets that the helper node has to overhear from the source node before transmission of re-coded RLNC packets is initiated.

In one embodiment, the method further comprises transmitting an ACK message from the second wireless node after the second wireless node has received a sufficient number of degrees-of-freedom (DOFs) to decode the group of data packets, wherein at least one of the first wireless node and the helper node will cease to transmit RLNC packets associated with the group of data packets in response to the ACK message.

In one embodiment, activating a helper node to assist in transmission of data from the first wireless node to the second wireless node includes activating a first helper node; and the method further comprises activating at least one additional helper node to assist in transmission of data from the first wireless node to the second wireless node.

In one embodiment, the at least one additional helper node includes a secondary helper node that is configured to overhear and store RLNC packets transmitted by the first helper node.

In one embodiment, the group of data packets is representative of a single generation of a unicast data transfer between a source node and a destination node via a route that includes the first and second wireless nodes.

In one embodiment, the group of data packets includes RLNC packets and generating RLNC packets at the first wireless node includes re-coding RLNC packets in the group of data packets.

In accordance with still another aspect of the concepts, systems, circuits, and techniques described herein, a machine implemented method for use in a wireless mesh network comprises: (i) acquiring a group of data packets at a first wireless node for transmission to a second wireless node via a direct wireless link; (ii) activating a helper node to assist in transmission of data from the first wireless node to the second wireless node by sending a request message from the first wireless node; (iii) generating random linear network coded (RLNC) packets at the first wireless node by linearly combining the group of data packets; (iv) initiating transmission of the RLNC packets from the first wireless node to the second wireless node; (v) calculating a delay indication for the helper node that sets a delay that the helper node will have to wait before transmitting re-coded versions of RLNC packets overheard from the first wireless node, wherein the delay indication is calculated based, at least in part, on channel conditions in the network; and (vi) transmitting the delay indication to the helper node.

In one embodiment, the method further comprises estimating, at the first wireless node, a number of RLNC packets that will be transmitted from the source node for the group of data packets, wherein the number of RLNC packets is estimated based, at least in part, on channel conditions in the network.

In one embodiment, the method further comprises estimating, at the first wireless node, a number of re-coded packets that will be transmitted from the helper node for the group of data packets, wherein the number of re-coded packets is estimated based, at least in part, on channel conditions in the network.

In accordance with a further aspect of the concepts, systems, circuits, and techniques described herein, a wireless node device comprises: (i) a wireless transceiver to support wireless communication with one or more other nodes in a wireless mesh network; (ii) helper node circuitry to determine whether the wireless node device is to serve as a helper node for a direct wireless link between a transmitting node and a receiving node in the network, wherein the transmitting node and the receiving node are both part of a common unicast route in the network; (iii) monitoring circuitry to overhear and store network coded packets transmitted by the transmitting node if the wireless node device is acting as the helper node; (iv) re-coding circuitry to re-code the stored network coded packets if the wireless node is acting as the helper node; and (v) delay circuitry to initiate transmission of the re-coded packets a finite amount of time after a first network coded packet is overheard by the monitoring circuitry if the wireless node is acting as the helper node.

In one embodiment, the finite amount of time is based, at least in part, on channel conditions in the network and/or active neighbor nodes in the network.

In one embodiment, the delay circuitry is configured to initiate transmission of re-coded packets after p network coded packets have been overheard by the monitoring circuitry, wherein p is based, at least in part, upon channel conditions in the network and/or active neighbor nodes in the network.

In one embodiment, the helper node circuitry is configured to receive and respond to a request from the transmitting node to serve as a helper node.

In one embodiment, the helper node circuitry is configured to monitor channel conditions in a vicinity of the wireless node device and autonomously determine whether to serve as a helper node for a nearby wireless link.

BRIEF DESCRIPTION OF THE DRAWINGS

The foregoing features may be more fully understood from the following description of the drawings in which.

DETAILED DESCRIPTION

The PlayNCool protocol uses network coding to encode packets for transmission within the network. More specifically, the protocol makes use of a form of network coding known as Random Linear Network Coding (RLNC). In RLNC, linear combinations of data packets are generated using random (or pseudorandom) coefficients. These linear combinations of packets may be referred to herein as coded packets, RLNC encoded packets, or simply RLNC packets. The random coefficients used to generate the linear combination are typically appended to the corresponding coded packets for eventual use in decoding (although other techniques for communicating the coefficients to subsequent nodes may alternatively be used).

In an RLNC enabled network, a generation parameter (g) may be defined for a flow to designate a number of original packets that will be combined together in each coded packet in the flow. Coded packets may then be transmitted to a destination node in "generations." In each generation, coded packets may be transmitted to the destination node until the destination node has acquired enough coded packets to be able to decode (or extract) the original packets. The decoding process will typically involve the solution of a linear system of equations. Each linearly independent coded packet received by a destination node will provide additional information for use in solving the linear system of equations. Thus, each linearly independent coded packet is often referred to as a "degree of freedom" or DOF in the network coding industry. A destination device must thus successfully receive a sufficient number of DOFs to be able to decode the original data packets of the present generation. For a particular flow, a parameter $P_i^{(k)}$ may be defined as the $i^{th}$ data packet of flow k. The linear combinations of the flow may then be defined as:

$$C_i^{(k)} = \sum_{j=1}^{g_k} a_{ij}^{(k)} P_j^{(k)}$$

where $C_i^{(k)}$ may be referred to as the $i^{th}$ "coded packet" or RLNC packet of flow k, $g_k$ is the generation size of flow k, and $\alpha_{ij}^{(k)}$ represent the randomly generated coefficients.

Figure 2:
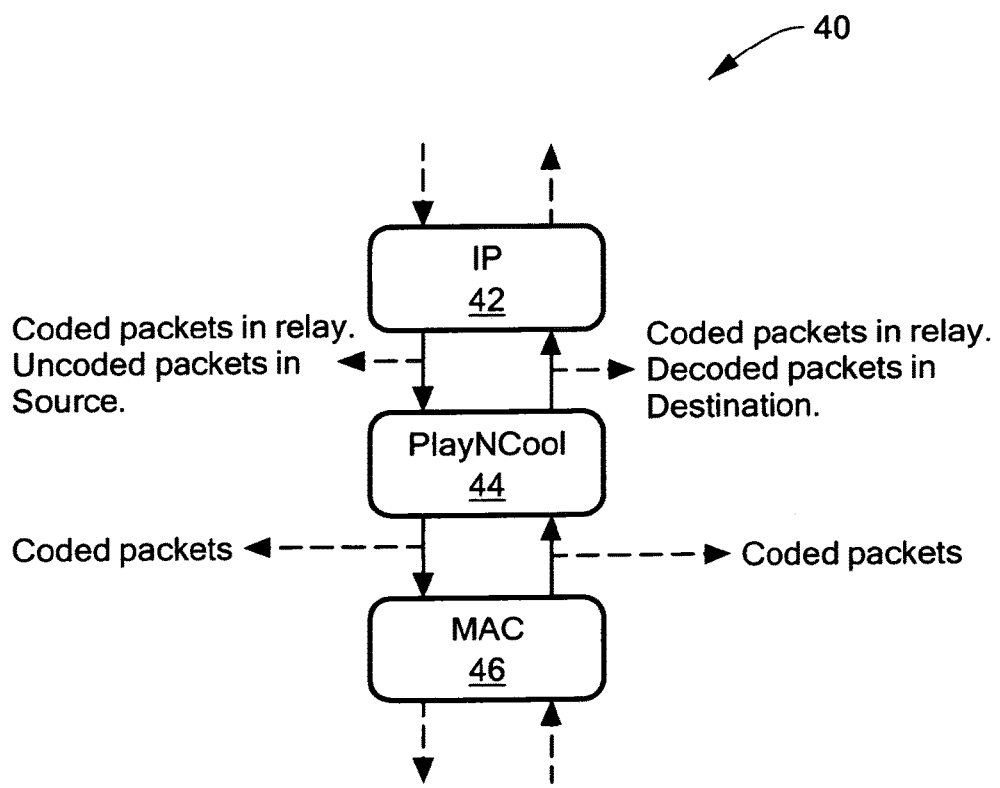
FIG. 2 is a diagram illustrating a portion of a protocol stack having a PlayNCool layer inserted between an IP layer and a MAC layer in accordance with an embodiment.

In some implementations, the PlayNCool protocol may be implemented as a new layer of a network protocol stack. For example, FIG. 2 is a diagram illustrating a portion of a protocol stack 40 having a PlayNCool layer 20 inserted between an IP layer 42 and a MAC layer 46 of the stack. As shown in FIG. 2, network coded packets may flow between the MAC layer 46 and the PlayNCool layer 44 of the stack in both directions. Within relay nodes of the network, coded packets may flow from the IP layer 42 to the PlayNCool layer 44. In a source node, uncoded packets flow between the MAC layer 46 and the PlayNCool layer 44. In a similar fashion, in relay nodes, coded packets flow from the PlayNCool layer 44 to the IP layer 42. In a destination node, decoded packets flow in this direction. It should be appreciated that the stack arrangement of FIG. 2 is merely an example of one possible configuration that may be used in an implementation. Alternative approaches also exist.

Figure 3:
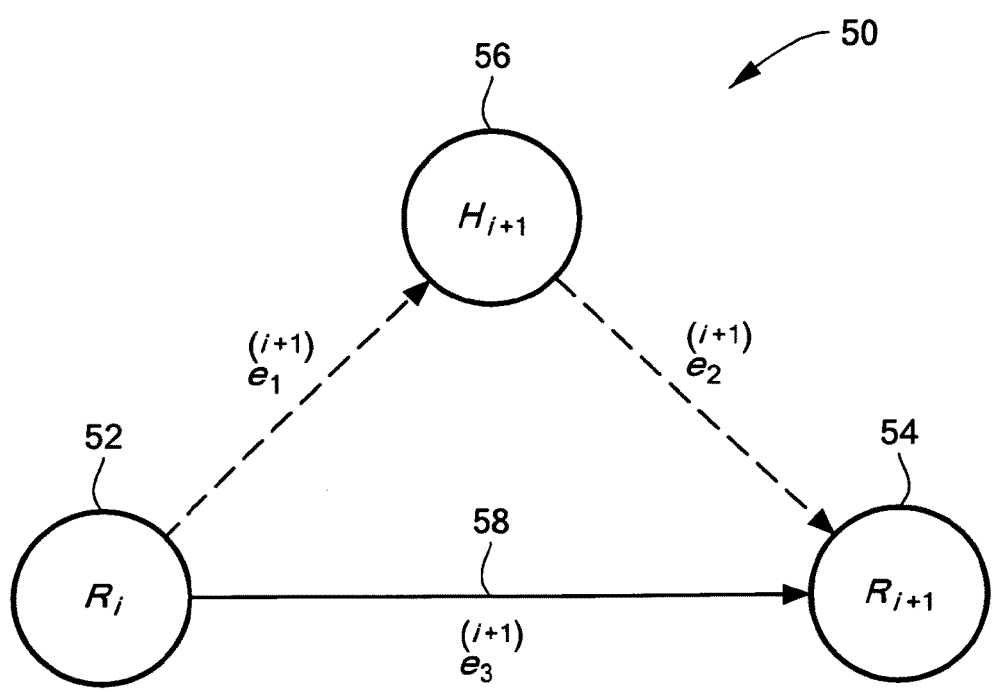
FIG. 3 is a diagram illustrating a basic topology that may be used in a wireless network implementing the PlayNCool protocol in accordance with an embodiment.

FIG. 3 is a network diagram illustrating a basic node topology 50 that may be used in a network implementing PlayNCool. As shown, the node topology 50 includes two relay nodes 52, 54 and a helper node 56. The $i^{th}$ relay node ($R_i$) 52 sends coded packets to the $(i+1)^{th}$ relay node ($R_{i+1}$) 54 via link 58. The helper node ($H_{i+1}$) 56 overhears the coded packets transmitted by the $i^{th}$ relay node ($R_i$) 52. Although not shown, for an n-hop network, the source node may be designated $R_0$ and the destination node may be designated $R_n$. Each inter-node link in the topology 50 may have a corresponding error probability that is indicative of the quality of the link. As shown in the FIG. 3, the error probabilities in the links between $R_i$ and $H_{i+1}$, $H_{i+1}$ and $R_{i+1}$, and $R_i$ and $R_{i+1}$ may be represented by $e_1^{(i+1)}$, $e_2^{(i+1)}$, and $e_3^{(i+1)}$, respectively. The error probabilities are assumed to be available in the network for $R_i$ and $R_{i+1}$.

Figure 1A:
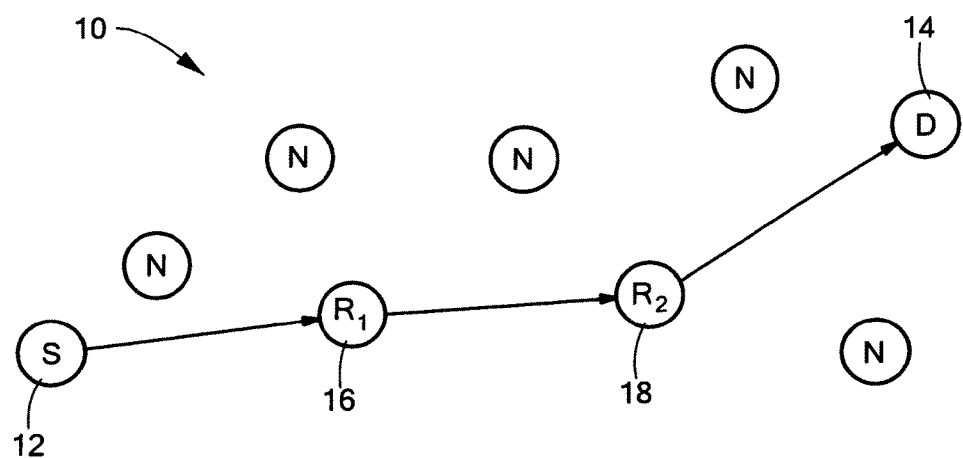
FIG. 1A is a diagram illustrating a traditional routing approach within a wireless mesh network.
Figure 1B:
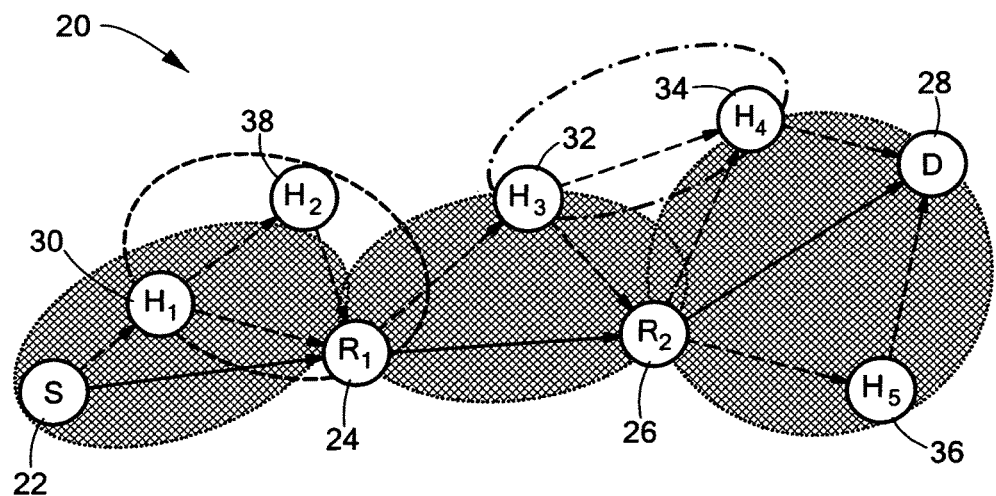
FIG. 1B is a diagram illustrating operation of the PlayNCool protocol alongside a traditional routing approach within a wireless mesh network in accordance with an embodiment.

FIG. 1B is a diagram illustrating an exemplary wireless mesh network 20 in accordance with an embodiment. The network 20 demonstrates possible operation of the PlayNCool protocol. As shown, the network 20 includes a number of successive instances of the node topology 50 of FIG. 3. A route is established in the network 20 from a source node (S) 22 to a destination node (D) 28 via a single path through first and second relay nodes ($R_1$ and $R_2$) 24, 26 (as in FIG. 1A). However, as will be described in greater detail, helper nodes 30, 32, 34, 36, 38 are defined in the network 20 and may be used to facilitate data delivery therein. The network layer of the source node 22 in FIG. 1B delivers uncoded packets to the PlayNCool layer. The PlayNCool layer then divides the uncoded packets into batches of g packets (where g is the generation size). For each generation, the source node 22 generates coded packets using random linear network coding (RLNC) and stores the coded packets in the MAC layer queue for transmission. Once the coded packets are buffered for transmission in the MAC queue, they cannot be removed from the queue. This is because the PlayNCool protocol was designed to be independent from the upper and the lower protocol layers.

It should be appreciated that the source node does not need to acquire all of the uncoded packets to be delivered to the destination node at the same time. That is, the uncoded packets may be acquired over a period of time in some implementations. Using this approach, the uncoded packets may be divided into generations as they are acquired and coded packets may be generated for the various generations over time.

The source node 22 transmits the coded packets buffered in the MAC queue for a first generation to the first relay node 24. It should be appreciated that, in some implementations, the source node does not have to wait until all packets in a particular generation are accumulated to begin transmission for the generation. That is, transmission may commence before all packets are accumulated for the generation. The source node 22 can choose a helper node (e.g., helper node 30) to increase the reliability of its link to the relay 24. To choose a particular node as a helper node, the source node 22 can send a request to the node. In an alternative (or additional) approach, a nearby node can auto-activate as a helper node when the link quality between source node 22 and the first relay 24 is low (e.g., below a threshold value, etc.).

The first helper node ($H_1$) 30 of FIG. 1B overhears transmissions of the source node 22 and stores the corresponding coded packets in a buffer. When the first helper node 30 accumulates a specific number of coded packets (typically a number less than g), it may begin to generate new coded packets by re-coding the recorded coded packets. That is, the helper node 30 may create new linear combinations of the buffered coded packets and transmit them to the intended relay 24. At this point, both the source node 22 and/or the helper node 30 may continue to transmit coded packets to the relay 24 until the relay 24 signals that it has acquired enough degrees of freedom to decode all g packets. In response to this feedback, the source node 22 may stop transmitting the current generation and start transmitting a new generation. As will be described in greater detail, in some embodiments, each helper node may control the number of coded packets that are generated based on a "Budget" metric. The relay node 24 may start to re-code and generate new coded packets upon reception of packets from the source node 22 and the helper node 30. The relay node 24 may then transmit the new coded packets to the next relay 26 and the process repeats for this link.

As described above, the source node 22 and/or the helper node 30 may continue to transmit coded packets to the first relay 24 until the relay 24 indicates (e.g., sends feedback) that enough DOFs have been received. It should be appreciated that the source node 22 and the helper node 30 do not necessarily stop transmitting at the same time. That is, depending on the circumstances or the implementation, either one of the two nodes may stop transmitting before the other. For example, in one scenario, the source node 22 may stop transmitting after a particular time and allow the helper node to complete the generation. In another scenario, the helper may transmit re-coded packets a certain number of times and then allow the source node to complete the generation.

Before transmitting, the source node 22 may estimate the number of coded packets that need to be transmitted on the link to the first relay 24. The estimation may be based on a heuristic mean value analysis of the DOFs delivered, considering the loss probabilities of the links. Another parameter that can be determined at this point is the number of packets (p) that the helper node 30 overhears before it starts transmitting coded packets. The value of p will determine how many coded packets the source node 22 and the helper node 30 need to send. The value of p will also determine the performance of the scheme. The value of p should be large enough to guarantee that the helper transmissions are "innovative" for the relay with high probability. A coded packet is considered innovative when its coefficient vector is linearly independent of the coefficient vector of the coded packets that the node has already received from that generation (i.e., they provided a new DOF). If p is too small, the helper node starts transmitting too early and the relay node will receive linearly dependent packets. Therefore, some of the early transmissions may be wasted. If p is too large, the helper node starts transmitting too late, which means the relay may have received most of the DOFs from the source node and the usefulness of the helper node is limited.

For the link between the first relay node 24 and the second relay node 26, the above described process may repeat. That is, a helper node 32 may be activated and the helper node 32 and/or the first relay node 24 may transmit re-coded packets until the second relay node 26 has received a sufficient number of packets to decode. This process may then repeat for each successive link in the route until the current generation has been successfully received in the destination node 28. The same process may then be repeated for each successive generation until all generations have been received at the destination node 28.

As shown in FIG. 1B, in some implementations, multiple (i.e., two or more) helpers may be activated to assist a single link between nodes. For example, a second helper 38 may be activated to assist the link between the first helper 30 and the first relay node 24 (thus further assisting the link between the source node 22 and the first relay node 24). In this scenario, the second helper 38 may overhear and store packets transmitted by the first helper node 30 to perform its function. In some embodiments, the first helper node 30 may be configured to determine that additional help is required and send a request to another node (e.g., helper 38) to serve as a secondary helper. In other embodiments, the second helper 38 may auto-activate or be activated by request from the source node 22.

In another example shown in FIG. 1B, two (or more) helper nodes 34, 36 may be activated to assist the link between the second relay node 26 and the destination node 28. These helper nodes 34, 36 may assist the corresponding link independent of one another (i.e., they both overhear packets transmitted by the second relay node 26). Based on channel conditions and/or other factors, the delays used by the two helper nodes 34, 36 may be different from one another in some implementations.

In addition, in some implementations, helper nodes associated with one link may opportunistically overhear and store packets transmitted by helper nodes associated with a different link. For example, as shown in FIG. 1B, helper node 34 associated with the link between the second relay node 26 and destination node 28 may overhear packets transmitted by helper node 32 associated with the link between first relay node 24 and second relay node 26. Helper node 34 may then use this overheard data to begin to transmit re-coded packets to destination node 28 earlier than would have been possible if it had not overheard the data (i.e., a shorter delay may be used).

Figure 4A:
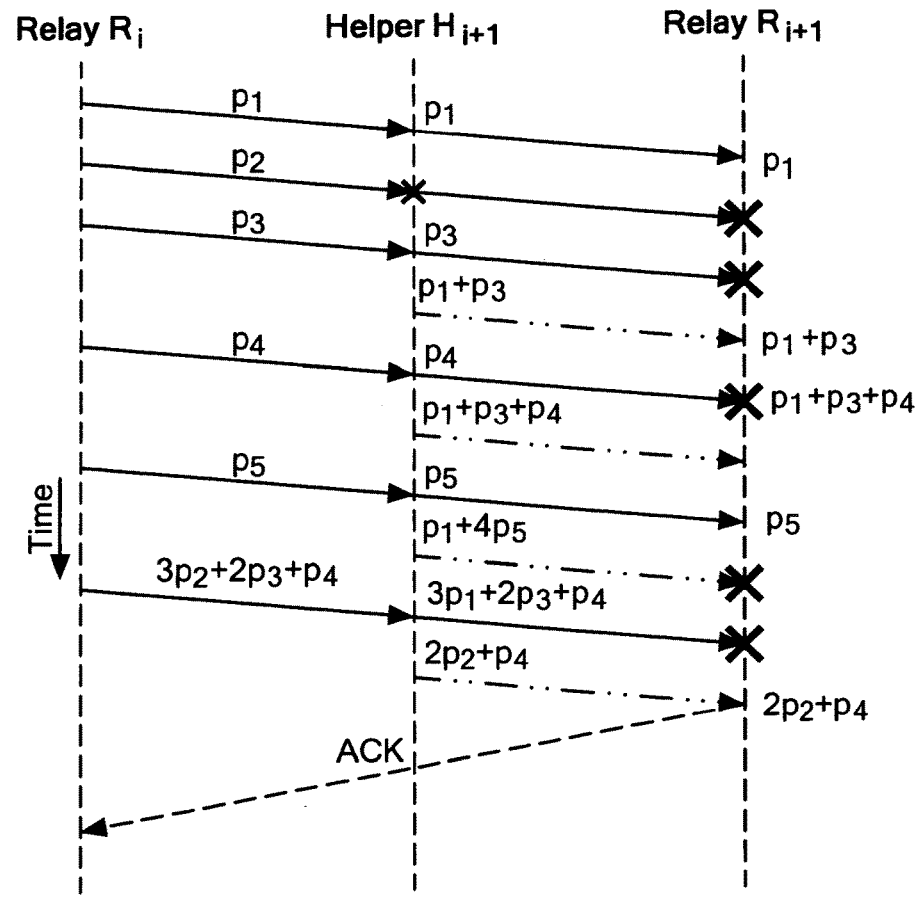
FIGS. 4A, 4B, and 4C are diagrams illustrating exemplary communication exchanges between nodes under the PlayNCool protocol for various values of p in accordance with an embodiment.
Figure 4B:
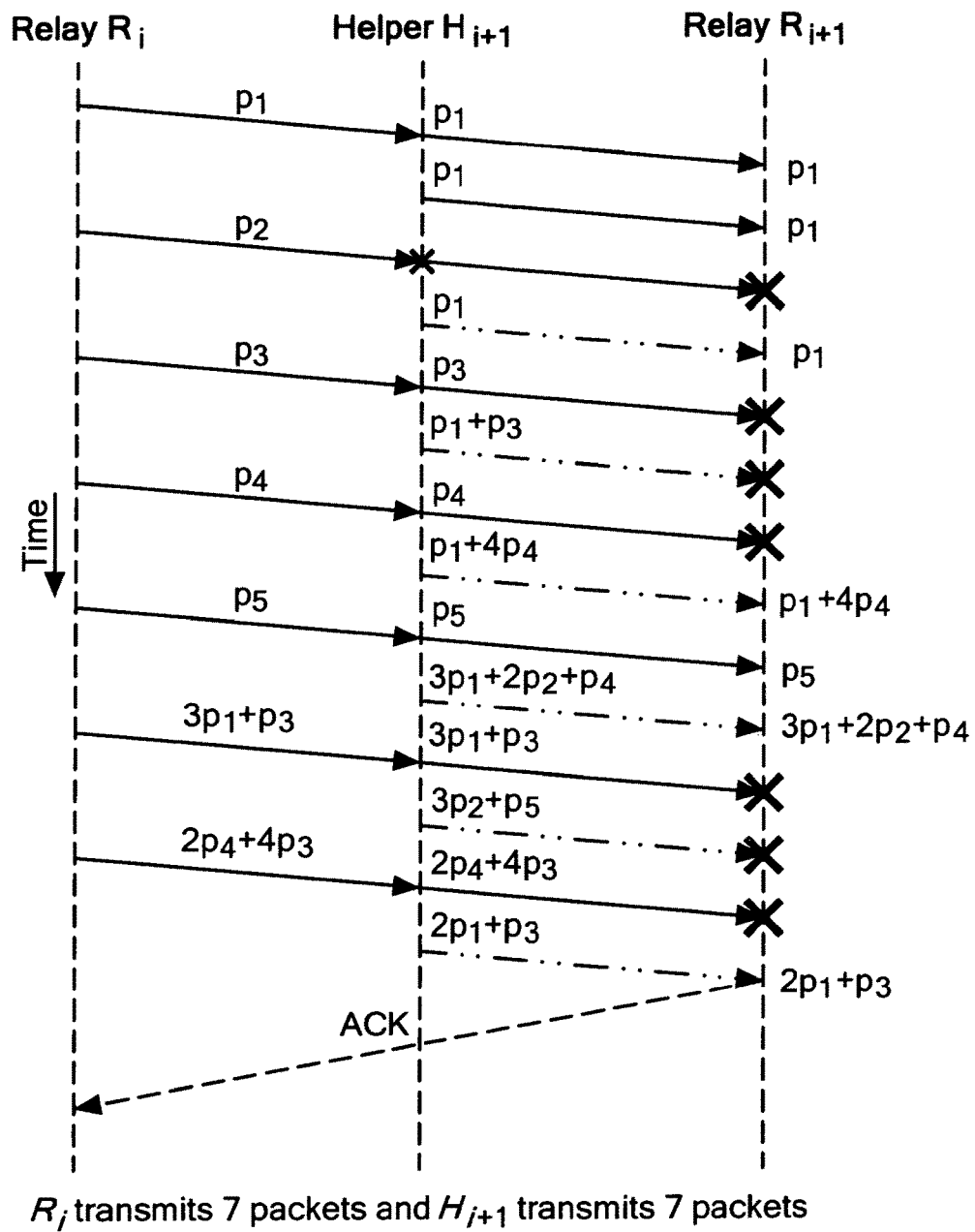
Figure 4C:
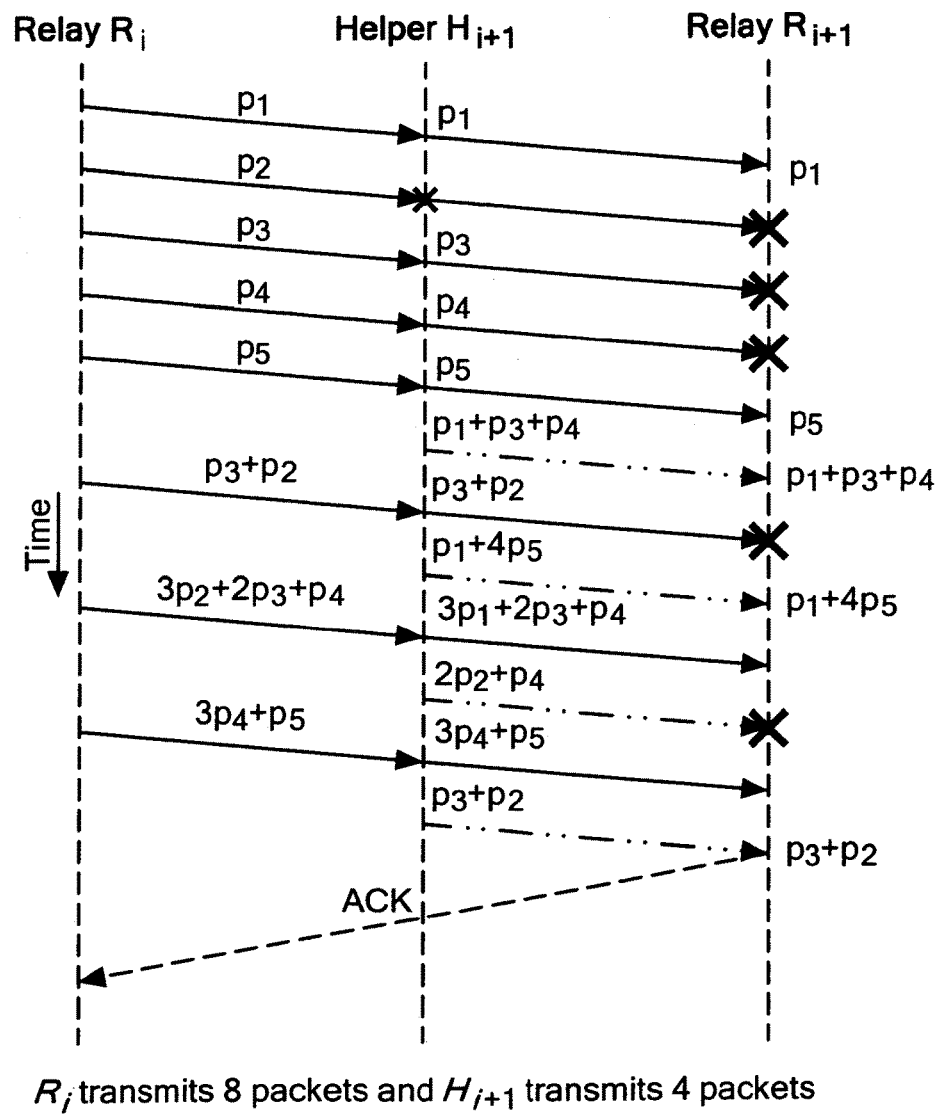

FIGS. 4a, 4b, and 4c are diagrams illustrating communications exchanges between nodes under PlayNCool for various values of p. In the example of FIG. 4a, p=2 is used. As a result, only 10 transmissions are needed to complete a generation (i.e., 6 from the first relay and 4 from the helper). In the example of FIG. 4b, p=1 is used and 14 transmissions are needed to complete a generation (i.e., 7 from the first relay and 7 from the helper). It should be noted from FIG. 4b that relay $R_{i+1}$ receives two non-innovative coded packets from helper $H_{i+1}$ in this example. In the example of FIG. 4c, p=3 is used. In this case, the total number of transmissions is 12 (i.e., 8 from the first relay and 4 from the helper). Thus, the best value of p in this scenario is 2.

The total number of transmitted packets from the source is equal to the number of transmissions before the helper is activated (r) plus the number of transmissions after the helper is activated (k). By considering the error probability between the source and the helper, p is given as:

$$p = (1-e_1^{(i+1)}) \cdot r \quad (1)$$

In the analysis, it was assumed that the MAC layer shares the channel equally between the nodes, which is a valid assumption for CSMA/CA. Based on this assumption, the helper and the source transmit k coded packets after the helper is activated. It was also assumed that the field size of RLNC is large enough so that the probability of receiving linearly dependent coded packets is low. In order to determine p, as well as the number of transmissions from the source and helper nodes, the following mean flow analysis may be used. It is assumed that the relay node should receive g innovative coded packets in total from the helper and the source to decode a generation. Thus:

$$g = r \cdot (1-e_3^{(i+1)}) + k \cdot (1-e_2^{(i+1)}) + k \cdot (1-e_3^{(i+1)}). \quad (2)$$

The value of r is calculated for two cases. In the first case, the number of incoming innovative packets to the helper is higher than the number of outgoing packets from the helper (i.e., $(1-e_1^{(i+1)}) \cdot e_3^{(i+1)} > 1-e_2^{(i+1)}$). Thus, the helper starts to transmit upon receiving the first innovative packet. The number of transmissions until the helper receives an innovative packet is $$r_a = \frac{1}{(1-e_1^{(i+1)}) \cdot e_3^{(i+1)}},$$

which means that $$p = \frac{1}{e_3^{(i+1)}}.$$

In the second case, $(1-e_1^{(i+1)}) \cdot e_3^{(i+1)} \leq 1-e_2^{(i+1)}$. Considering that the number of incoming innovative packets in the helper should be equal to the number of outgoing innovative packets from the helper results in:

$$r_b \cdot (1-e_1^{(i+1)}) \cdot e_3^{(i+1)} + k \cdot (1-e_1^{(i+1)}) \cdot e_3^{(i+1)} = k \cdot (1-e_2^{(i+1)}), \quad (3)$$

Combining Eq. (2) and Eq. (3), gives:

$$r_b = -g \cdot \frac{L(e_1^{(i+1)}, e_2^{(i+1)}, e_3^{(i+1)})}{G(e_1^{(i+1)}, e_2^{(i+1)}, e_3^{(i+1)})}.$$

where $L(a, b, c) = -1+b+c-a \cdot c$ and $G(a, b, c) = (2-c-b) \cdot (c-a \cdot c) - (1-c) \cdot L(a, b, c)$. The number of coded packets that need to be transmitted on the link from the source is:

$$B_s(r) = \frac{g + (1-e_2^{(i+1)}) \cdot r}{2 - e_3^{(i+1)} - e_2^{(i+1)}}. \quad (4)$$

where r is $r_a$ and $r_b$ for cases 1 and 2, respectively. Thus, in some implementations, Equation 4 may be used to determine the number of RLNC packets that are generated by the source node and placed in the MAC layer.

As described above, the source node estimates the number of coded packets that need to be transmitted. However, because of randomness in the channel and the dynamic characteristics of wireless networks, this estimate (which is based on mean performance) does not guarantee that a sufficient number coded packets will be generated. PlayNCool implements two alternative approaches to deal with this problem. As described below, the first approach involves monitoring the transmission queue and the second approach involves estimating the completion time.

In the first approach, a queue monitoring mechanism monitors the transmission queue to guarantee that there is enough packets in the transmission queue to transmit. When the number of coded packets in the queue is less than a certain threshold (e.g., 10 coded packets) and the source has not received an acknowledgement (ACK) packet, the source node generates extra coded packets for the generation (e.g., 10% extra). In the second approach, an expected timeout value is provided for each transmitted generation that allows the source node to send additional coded packets if no ACK is received after a predetermined time. If the transmission time of a packet is t, the timeout of a generation may be estimated as, for example, $t \cdot (r+k)$. If the timeout of a generation has elapsed and the source node has not received an ACK, the source node can generate and transmit 10% additional coded packets for that generation. A new timeout may be set for the additional coded packets. This process may then be repeated until an ACK is received. As described previously, upon receiving an ACK for a current generation, the source node may stop transmitting the current generation and start transmitting a next generation.

As discussed above, a helper node may start transmitting when it has accumulated p coded packets. The helper node may transmit k coded packets when it is activated. Based on Equation 2 above, the value of k may be calculated as follows:

$$k(r) = \frac{g - r \cdot (1-e_3^{(i+1)})}{2 - e_3^{(i+1)} - e_2^{(i+1)}}. \quad (5)$$

where r may be calculated for the different cases discussed above ($r_a$ and $r_b$). The helper node should not generate all k coded packets at the same time. This will increase the number of non-innovative transmissions because the helper should not generate much more than it knows (e.g., it should not generate 50 coded packets if it has received only one coded packet). In some implementations, a helper node $H_{i+1}$ may control the number of coded packets that are generated by a metric called "budget." Budget ($B_h(t+1)$) may be defined as the number of coded packets that a helper node can generate at time t+1:

$$B_h(t+1) = B_h(t) + C_h^{(i+1)} - N_h^{(i+1)}(t) \quad (6)$$

where the credit $C_h^{(i+1)}$ is the number of generated coded packets in the helper $H_{i+1}$ per a new incoming coded packet and $N_h^{(i+1)}(t)$ is the number of transmitted packets at time t. $N_h(t)$ can be increased until $B_h(t+1) \in [0,1)$.

Referring back to FIG. 3, when the source node transmits w coded packets, the helper node is expected to receive $y = w \cdot (1-e_1^{(i+1)})$ coded packets. Consequently, when the helper receives one coded packet (y=1) from the source, it increases its budget by a credit value equal to:

$$C_h^{(i+1)} = (1-e_1^{(i+1)})^{-1} \quad (7)$$

When the budget is greater than one, the helper node generates a re-coded packet and decreases the budget by one. Then, it puts the re-coded packet in the transmission queue. When the budget reaches zero, the helper node stops generating packets until the budget is again increased. The helper node may finish transmitting coded packets when either (a) it has received an ACK packet from the relay or (b) when it has finished generating all k coded packets.

Similar to the helper node, a relay node should not transmit much more than it knows, to avoid non-innovative packet transmissions. A relay node can control the number of generated packets using a relay budget ($B_r(t+1)$) calculated as follows:

$$B_r(t+1) = B_r(t) + C_r^{(i+1)} - N_r^{(i+1)}(t) \qquad (8)$$

where the credit $C_r^{(i+1)}$ is the number of generated coded packet in relay $r_{i+1}$ per new incoming coded packet and $N_r^{(i+1)}(t)$ is the number of transmitted packets at time t. When the relay $R_i$ transmits a coded packet, the helper $H_{i+1}$ and the relay $R_{1+1}$ can both increase the number of DOFs. Therefore, the number of coded packets that needs to be transmitted from the $R_{i+1}$ before the helper or the relay receives a new coded packet is equal to:

$$C_r^{(i+1)} = (1 - e_3^{(i+1)} \cdot e_1^{(i+1)})^{-1} \qquad (9)$$

The relay $R_{i+1}$ generates a re-coded packet when the budget is higher than one. The relay $R_{i+1}$ transmits an ACK packet to the relay $R_i$ when it has received g DOFs.

To be sure that there are always enough coded packets in the transmission queue, the relay may generate additional coded packets using one of the strategies of the source. The relay may cease transmissions for the current generation and start generating packets for the next generation after receiving an ACK from the next relay.

Different policies for activating a helper node are possible. Two such policies are described below. The calculation of credits and budget may follow the same ideas described above. A first policy may be referred to as the "wait for all degrees of freedom" (WFF) policy. Under this policy, the helper starts transmitting when it has accumulated all DOFs. By using the same analysis described above, the transmission budget for the relay of Equation (8) may be used. Since the helper does not need to overhear the coded packets after it starts transmitting, the budget value does not increase by overhearing (i.e., it is fixed). By using the same analysis from above, the transmission budget in the helper may be calculated as follows:

$$B_h = \frac{g - r \cdot (1 - e_3^{(i+1)})}{2 - e_3^{(i+1)} - e_2^{(i+1)}}, \qquad (10)$$

where $$r = \frac{g}{1 - e_1}.$$

The value of the budget in the helper will be decreased by one when a coded packet is generated until the budget reaches zero. Then, the helper node will not generate any more packets.

A second policy may be referred to as the "wait for a fraction of the DOFs" (WFH) policy. Under this policy, the helper starts transmitting when the helper and the relay receive enough DOFs jointly to decode a generation. Then, the source stops transmitting the coded packets. Using the same type of the analysis from above, the transmission budget for the relay may be calculated using Equation (8). When the helper starts transmitting, the source will not transmit any coded packets. Therefore, the budget value will not increase by receiving a new coded packet. Thus, the budget may be calculated using Equation (10) above, where, $r = g \cdot (1 - (e_1^{(i+1)} \cdot e_3^{(i+1)}))^{-1}$.

To verify the performance of the PlayNCool policy, the ns-3 simulator was used. The ns-3 simulator is an open source discrete event network simulator intended to be used for research on computer networks. In the simulation performed, a source node sends a UDP flow to a destination node using static routing protocol in the IP layer. Moreover, the IEEE 802.11b wireless networking standard is used. In this implementation, for simplicity, a predefined helper was chosen between two relays.

As shown in FIG. 2, the PlayNCool layer was inserted between the MAC layer and the IP layer in the ns-3 protocol stack. The PlayNCool layer in the source receives uncoded packets from the IP layer and, after coding the packets, the PlayNCool layer delivers them to the MAC layer. When the relay receives the coded packets, it forwards them from the MAC layer to the IP layer. Once the IP layer finds the next hop for the coded packets, it returns the coded packets to the PlayNCool layer. The PlayNCool layer re-codes the packets and delivers them to the MAC layer. The IP layer of the helper does not need to find the next hop for the overheard packets because it knows the sender and receiver from the packet header. Thus, it should not forward the coded packets to the IP layer. The PlayNCool layer overhears the coded packets from $R_i$ and it re-codes and forwards them to $R_{1+1}$.

Figure 5:
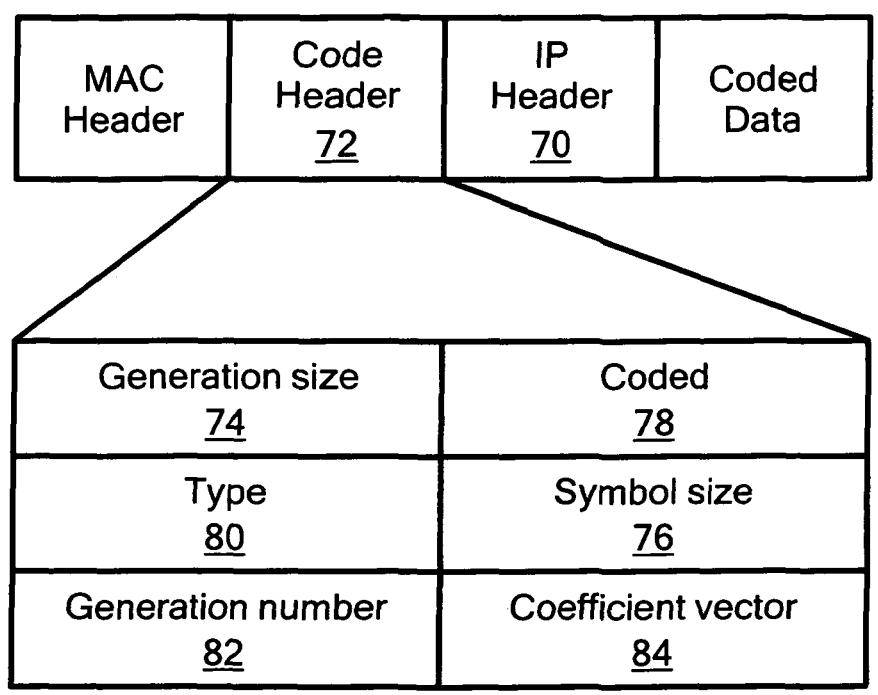
FIG. 5 is a diagram illustrating an exemplary packet structure that may be used in a network implementing the PlayNCool protocol in accordance with an embodiment.

When the source node generates a coded packet, it adds an IP header 70 and a PlayNCool header 72 to each coded packet, as shown in FIG. 5. The IP header 70 cannot be coded because the IP layer needs the IP header to find the next hop. Each relay uses the PlayNCool header 72 to re-code packets of a generation. As shown in FIG. 5, the PlayNCool header 70 may include: a generation size field 74 to indicate a size of the present generation, a symbol size field 76 to indicate a size of each coded packet, a coded flag to indicate whether the packet is coded or uncoded, a type field 80 to indicate the ACK packets, a generation number field 82 to indicate the generation number of the packets, and a coefficient vector to carry the coefficients of the coded packets. It should be appreciated that the PlayNCool header format of FIG. 5 represents one possible header format that was used for simulation purposes. It should be appreciated that other header formats that include a different combination of fields and/or a different organization of fields may be used with PlayNCool. In order to code and decode the packets, the Kodo library was used (see, e.g., "KODO: An Open and Research Oriented Network Coding Library," by Pedersen et al., Workshop on Network Coding App. and Pro. (NC-Pro), Networking 2011, Spain, 2011). Kodo is a network coding library that is typically used for commercial software and for research.

In the simulation, the gain of the PlayNCool approach discussed previously was evaluated. Gain may be defined as the completion time when there is no helper node divided by the completion time of different helper policies. First, the simulation results of the PlayNCool approach was compared with the other helper polices in the basic topology for a single hop. This basic topology for three nodes includes a sender, a helper, and a receiver, as shown in FIG. 3. The parameter x is defined as the number of neighboring nodes that generate extra load in the network. In the simulation, $g=50$, $e_2^{(i+1)}=0.6$, $e_3^{(i+1)}=0.8$, and $x=5\%$.

Figure 6:
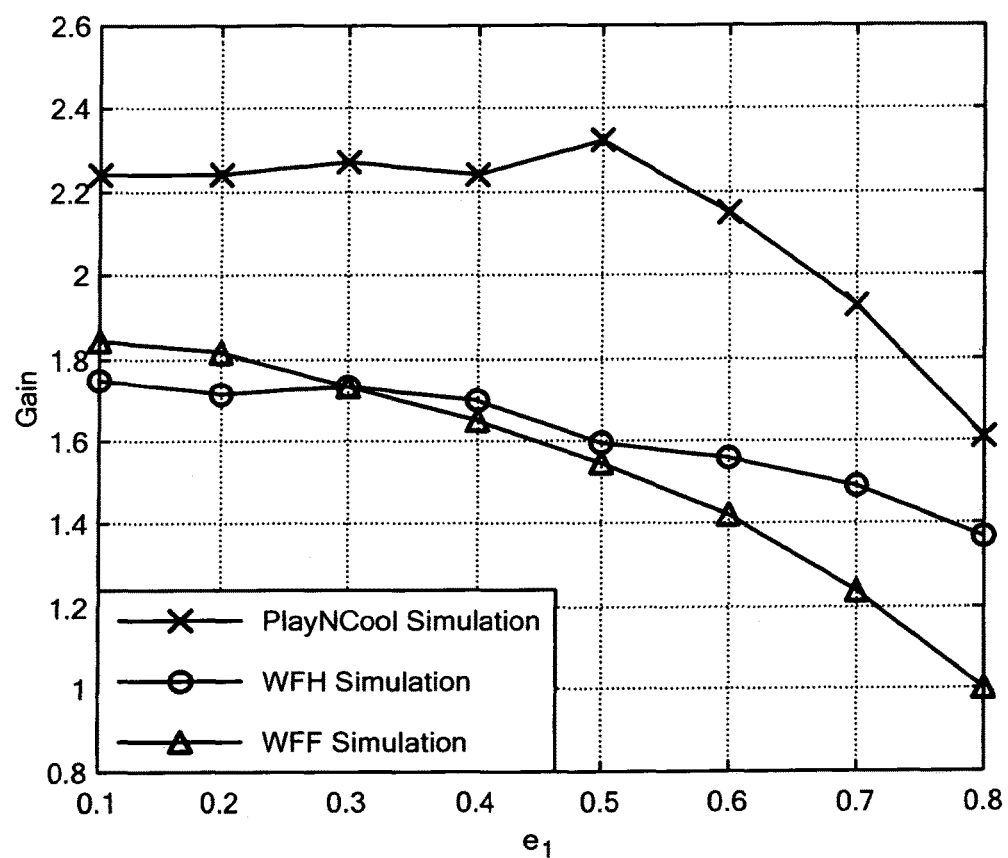
FIG. 6 is a diagram illustrating an exemplary packet structure that may be used in a network implementing the PlayNCool protocol in accordance with an embodiment.

FIG. 6 is a plot illustrating the results of the simulation as a function of $e_1^{(i+1)}$. The pot includes results for PlayNCool as well as the WFH policy, and the WFF policy. As shown, the highest gain of PlayNCool is close to 2.2. This means that the PlayNCool protocol transmits 2.2 times faster than the approach without the helper. This gain is much higher than the gain of the other two policies. Even when $e_1^{(i+1)}$ becomes harsh and reaches 0.8, the plot shows that the gain is still close to 1.5 using PlayNCool.

Figure 7:
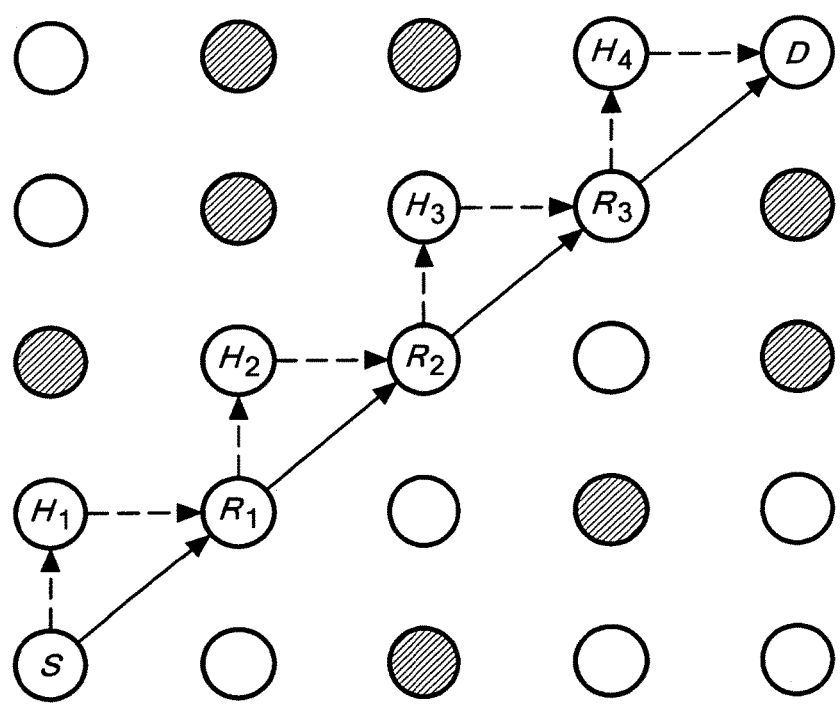
FIG. 7 is a diagram illustrating a network grid of 25 nodes that was used to evaluate various performance aspects of the PlayNCool protocol in accordance with an embodiment.
Figure 8:
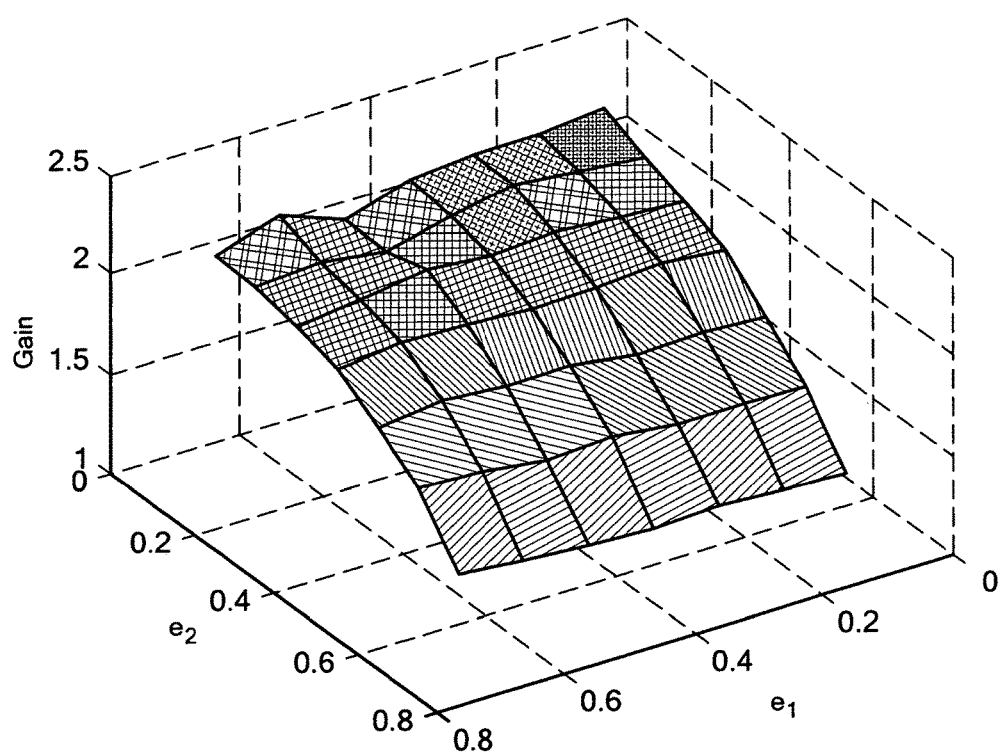
FIG. 8 is a plot illustrating gain (i.e., improvement in completion time) as a function of channel error probabilities in accordance with an embodiment.

The performance of the end-to-end transmission with different link quality conditions is an interesting metric for wireless networks. To estimate this metric, a wireless mesh network that includes a grid of 25 nodes was defined, as shown in FIG. 7. With reference to the figure, a source node (S) transmits 12 generations to a destination node (D) through three relays ($R_1$, $R_2$, and $R_3$). The crosshatched nodes generate extra traffic in the network to increase the competition between nodes to access the channel. In this topology, g=50 and $e_3^{(i+1)}$=0.6 are used. FIG. 8 illustrates the results of the simulation. As shown, the gain is mostly determined by $e_2^{(i+1)}$ and reaches a maximum of 2.3. However, when $e_2^{(i+1)}$=0.6, the gain is close to 1.5 which is quite high considering the high losses on packets coming from the helper.

Figure 9:
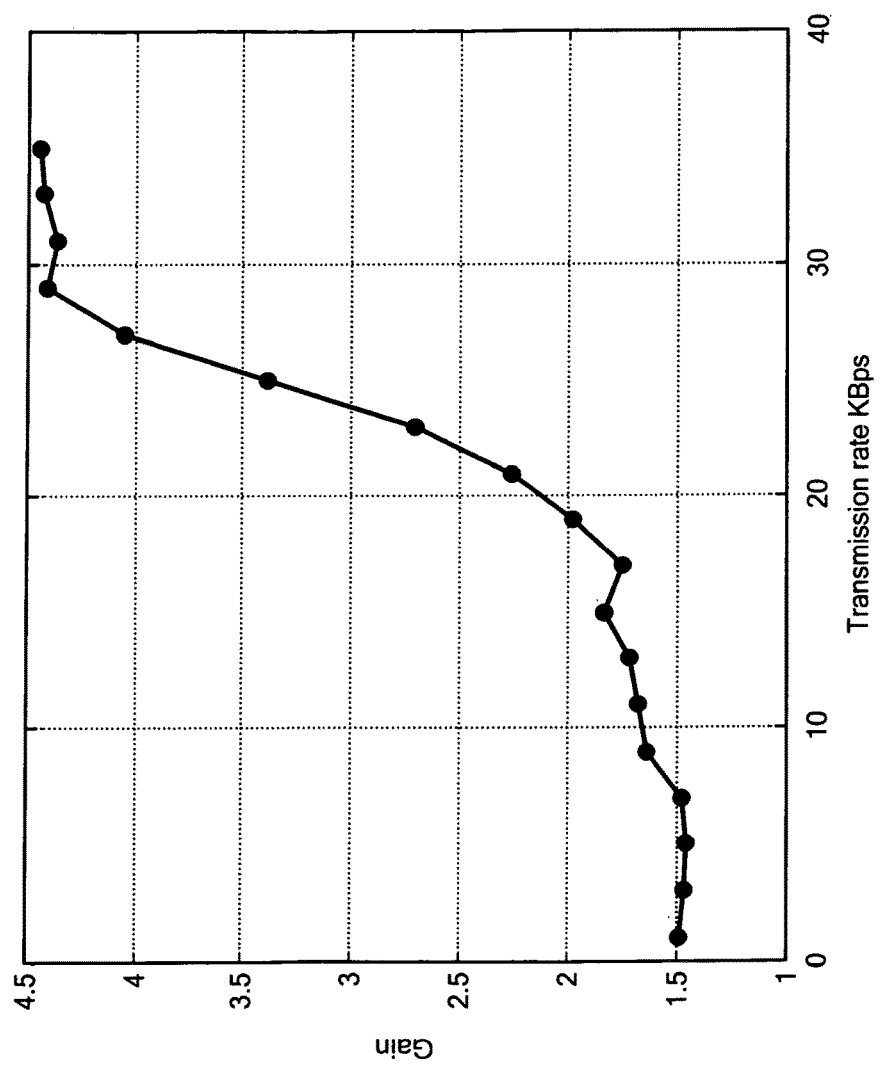
FIG. 9 is a plot illustrating gain as a function of load for the PlayNCool protocol in accordance with an embodiment.

The competition between nodes to access the channel has a significant effect on the gain. By increasing the load, the competition between nodes increases. To study the effect of the load, the grid of FIG. 7 was used. It was assumed that all of the nodes around the main flow were generating the load. FIG. 9 is a plot illustrating the effect of load on gain for the PlayNCool protocol. The plot of FIG. 9 corresponds to link error probabilities of $e_1^{(i+1)}$=0.4, $e_2^{(i+1)}$=0.4, and $e_3^{(i+1)}$=0.8. As shown, the gain of PlayNCool increases by increasing the transmission rate and it reaches a maximum of about 4.4. The reason PlayNCool has high gain is because the source and the helper are active at the same time and this allows them to access the channel more frequently and to increase the priority of the current flow for a fraction of the total transmission time in PlayNCool. Given that this reduces the total transmission time quite dramatically, this temporary increase of transmissions has a positive effect on the overall system. When the rate increases beyond a certain point, the gain of the PlayNCool protocol stabilizes because the MAC protocol divides the channel between nodes equally and the channel is fully congested.

Figure 10:
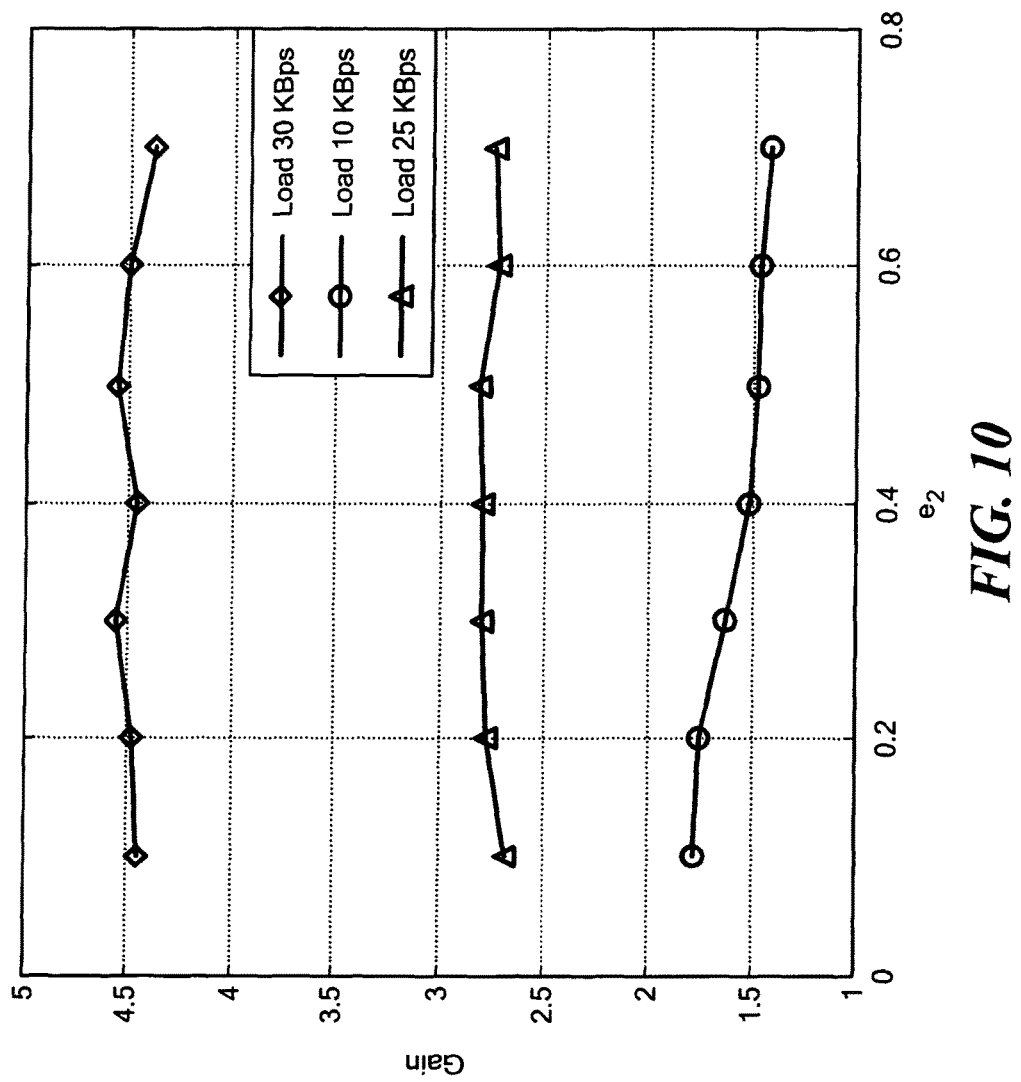
FIG. 10 is a plot illustrating gain as a function of channel error probability and load for the PlayNCool protocol in accordance with an embodiment.

FIG. 10 is a plot illustrating the effect on gain of the $e_2^{(i+1)}$ loss probability and the load for the PlayNCool protocol. As shown, when the load in the network is low, the gain will decrease when the error probability increases. Conversely, the effect of $e_2^{(i+1)}$ on gain is relatively minor under high load because the collision rate is much higher than the loss rate and the gain is determined mostly by the load in this case.

Figure 11:
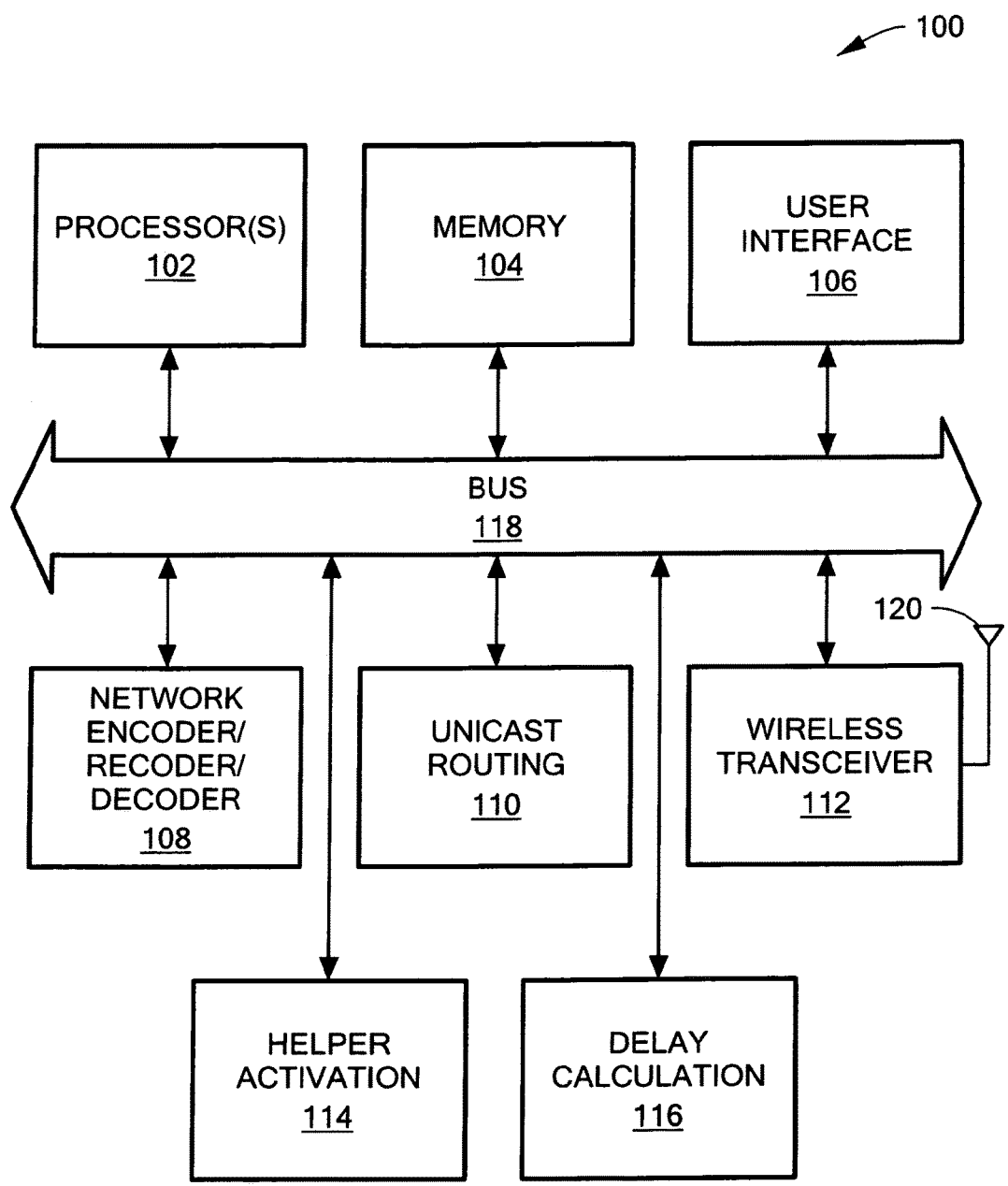
FIG. 11 is a block diagram illustrating an exemplary node architecture that may be used in a node of a network that incorporates features of the present disclosure.

FIG. 11 is a block diagram illustrating an example node architecture 100 that may be used in a node of a network that incorporates features of the present disclosure. As illustrated, the node architecture 100 may include: one or more digital processors 102, a memory 104, a user interface 106, a network encoder/recoder/decoder 108, a unicast routing circuit 110, a wireless transceiver 112, helper activation circuitry 114, and delay calculation circuitry 116. A bus 118 and/or other structure(s) may be provided for establishing interconnections between the various components of device architecture 100. Digital processor(s) 102 may include one or more digital processing circuits/devices that are capable of executing programs or procedures to provide functions and/or services for the corresponding node or user. Memory 104 may include one or more digital data storage systems, devices, and/or components that may be used to store data and/or programs for other elements of the node device architecture 100. User interface 106 may include any type of devices, components, or subsystems for providing an interface between a user and a corresponding node device. Wireless transceiver 112 may include any type of transceiver that is capable of supporting wireless communication with one or more remote wireless entities.

Network encoder/recoder/decoder 108 may include any type of device, circuit, and/or system for performing network encoding, re-coding, and/or decoding for a node device. In a source node device that will generate and transmit network coded packets, network encoder/recoder/decoder 108 may include network encoding functionality (e.g., circuitry for implementing random linear network coding). Likewise, in a receiving device that will receive and decode network coded packets, network encoder/recoder/decoder 108 may include decoding functionality. In a node that may serve as both a source node and a destination node, both network encoding and decoding functionality may be provided. In an intermediate node that will receive, store, and recode packets, the network encoder/recoder/decoder 108 may include network encoding, network decoding, and/or network recoding functionality.

Unicast routing circuitry 114 is operative for determining one or more unicast routes through a wireless mesh network for a corresponding unicast session. The unicast routing circuitry 114 may use any of a number of different routing algorithms or strategies, including traditional unicast routing schemes. In some embodiments, the unicast routing circuitry 114 may be configured to determine multi-path routes through the network for one or more unicast sessions. Helper activation circuitry 114 is operative for identifying and activating a helper node in the wireless mesh network to provide assistance to a direct wireless link within a unicast route in the network. The helper activation circuitry 114 may first identify one or more nodes in the network that can serve as helpers for a particular link (based on, e.g., location, frequency, available bandwidth, etc.). The helper activation circuitry 114 may then send a request to the identified node(s) requesting assistance. A node that accepts a request may then serve as the helper node for the corresponding link. The helper activation circuitry 114 within a node will typically activate a helper for a wireless link between the node itself and one or more other nodes. The requested node may or may not have the option of turning down the request to serve as a helper. In some embodiments, the helper activation circuitry 114 may only ask for help for a particular link in certain circumstances (e.g., the link is of low quality, etc.). As described previously, in some embodiments, helper nodes may be capable of self activation based on, for example, channel conditions in the network or some other condition or occurrence.

Delay calculation circuitry 116 is operative for determining a delay indication for use by a helper node in the network. The delay indication may indicate an amount of time that a helper node will have to wait before it can begin transmitting re-coded packets in the network. As described previously, by having a helper node wait for a particular period of time before transmitting, performance can be increased in the network. If allowed to transmit too soon, for example, the receiver node may receive, at least initially, linearly dependent (i.e., non-innovative) coded packets. If allowed to transmit too late, the receiver node may have already received most of the DOFs from the transmitting node and the usefulness of the helper node is limited. A delay may be calculated that is somewhere between these extremes. In some embodiments, network channel information is used to determine the delay value. The channel information may be generated by, for example, the routing algorithm that is used in the network. In some embodiments, the delay indication may be stated as the number (p) of transmitted coded packets of a transmitting node that have to be overheard by a helper node before the helper can transmit. As will be appreciated, other formats for indicating a delay amount may alternatively be used.

Although not shown in FIG. 11, in some embodiments, a node may include circuitry for estimating a total number of coded packets that will have to be transmitted by both a transmitting node and a helper node for each generation. This number may then be used to determine how many coded packets the transmitting node will have to initially generate and store in the buffer. It will also determine the number of re-coded packets that the helper node will have to transmit and generate.

Although illustrated as separate units in FIG. 11, it should be appreciated that the functions of the network encoder/recoder/decoder 108, the unicast routing unit 110, the helper activation circuitry 114, and/or the delay calculation circuitry 116 may be implemented, either partially or fully, within another component or device of a corresponding node in some implementations (e.g., within processor(s) 102 or similar circuitry of FIG. 11, etc.).

Digital processor(s) 102 may include, for example, one or more general purpose microprocessors, digital signals processors (DSPs), application specific integrated circuits (ASICs), field programmable gate arrays (FPGAs), programmable logic arrays (PLAs), programmable logic devices (PLDs), reduced instruction set computers (RISCs), controllers, microcontrollers, multi-core processors, processor complexes, and/or other processing devices, circuits, or systems, including combinations of the above. Digital processor(s) 102 may be used to, for example, execute an operating system for a corresponding node device. Digital processor(s) 102 may also be used to, for example, execute one or more application programs for a node device. In addition, digital processor(s) 102 may be configured to implement, either partially or fully, one or more of the communications related processes or techniques described herein in some implementations.

As described above, the wireless transceiver 112 may include any type of transceiver that is capable of supporting wireless communication with one or more remote wireless entities. In various implementations, the wireless transceiver 112 may be configured in accordance with one or more wireless networking standards and/or wireless cellular standards. In some implementations, multiple wireless transceivers may be provided to support operation in different networks or systems in a surrounding environment or with different wireless networking and/or cellular standards. Wireless transceiver 112 may, in some implementations, be capable of communicating with peer devices in a peer-to-peer, ad-hoc, or wireless mesh network arrangement. In addition, in some implementations, wireless transceiver 112 may be capable of communicating with a base station or access point of an infrastructure-type wireless communication system or network. As illustrated in FIG. 11, wireless transceiver 112 may be coupled to one or more antennas 90 and/or other transducers to facilitate the transmission and/or reception of communication signals. In some implementations, wireless transceiver 112 may be used to implement, either partially or fully, one or more of the communications related processes or techniques described herein. It should be appreciated that the techniques described in the present disclosure may, in some implementations, be implemented in wired communications networks or other networks or systems that do not use wireless communication. In some of these implementations, wireless transceiver 112 may be replaced with or supplemented by, for example, a wired communication device, component, card, or other structure.

Memory 104 may include any type of system, device, or component, or combination thereof, that is capable of storing digital information (e.g., digital data, computer executable instructions and/or programs, etc.) for access by a processing device and/or other component. This may include, for example, semiconductor memories, magnetic data storage devices, disc based storage devices, optical storage devices, read only memories (ROMs), random access memories (RAMs), non-volatile memories, flash memories, USB drives, compact disc read only memories (CD-ROMs), DVDs, Blu-Ray disks, magneto-optical disks, erasable programmable ROMs (EPROMs), electrically erasable programmable ROMs (EEPROMs), magnetic or optical cards, and/or other digital storage suitable for storing electronic instructions and/or data.

It should be appreciated that the node architecture 100 of FIG. 11 represents one possible example of a node architecture that may be used in an implementation. Other architectures may alternatively be used. As used herein, the term "node device" or "node" is used to describe any type of digital electronic device, system, or structure that includes some form of communication capability (wireless and/or wired) and may become part of a network. This may include, for example, a laptop, desktop, notebook, or tablet computer; a personal digital assistant (PDA); a personal communication service (PCS) device; a personal navigation assistant (PNA); a cellular telephone, smart phone, or other wireless communication device; a pager; a wireless sensor device; a satellite communication device; a media player having communication capability; a digital storage device with communication capability, a wireless base station, a wireless access point, a subscriber station, a wireless transceiver device, an integrated circuit, a network server, and/or other devices and systems. It should be appreciated that all or part of the various devices, processes, or methods described herein may be implemented using any combination of hardware, firmware, and/or software.

Figure 12A:
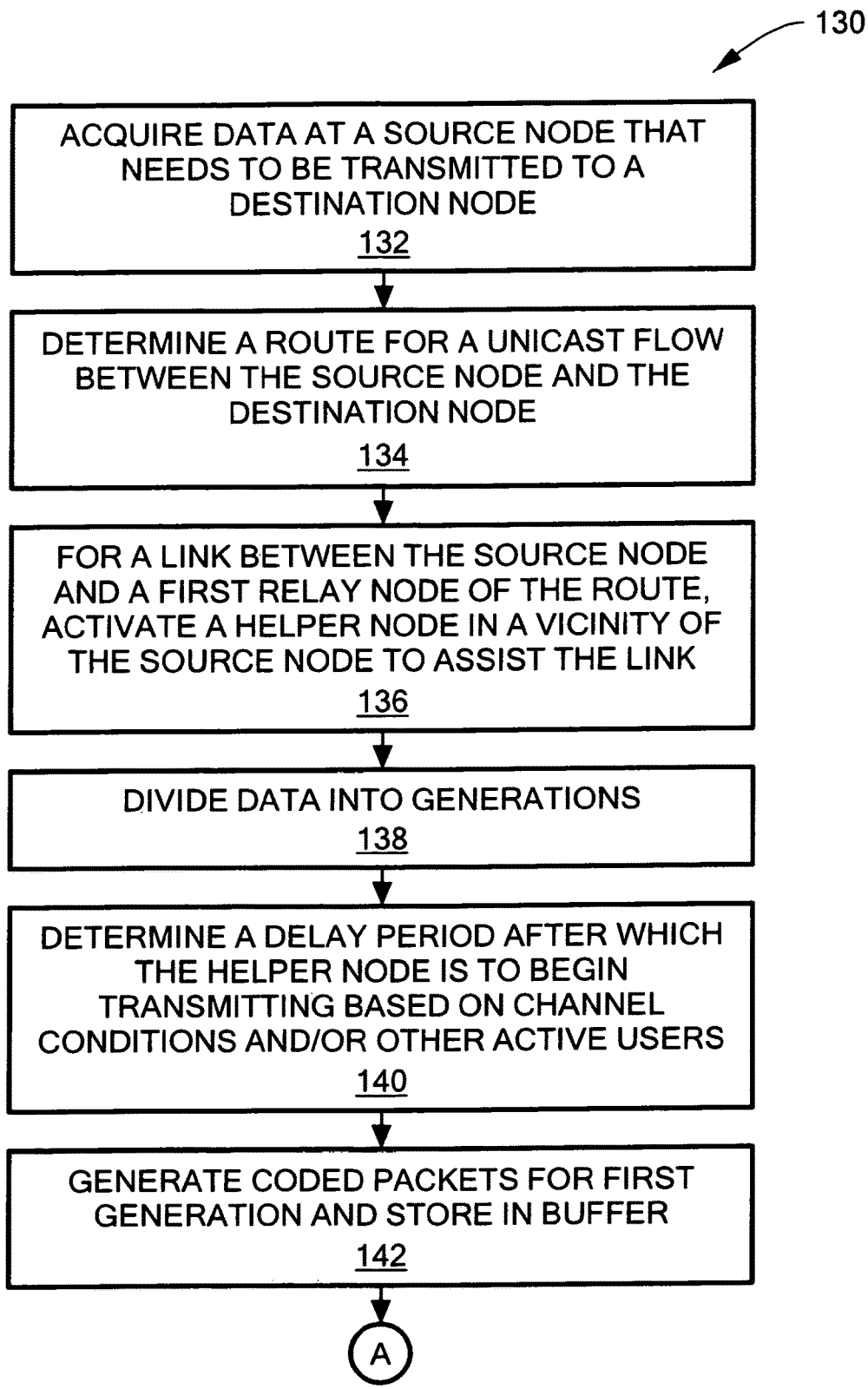
FIGS. 12A and 12B are portions of a flow diagram illustrating a process for use in transferring data from a source node to a destination node in a wireless mesh network in accordance with an embodiment.
Figure 12B:
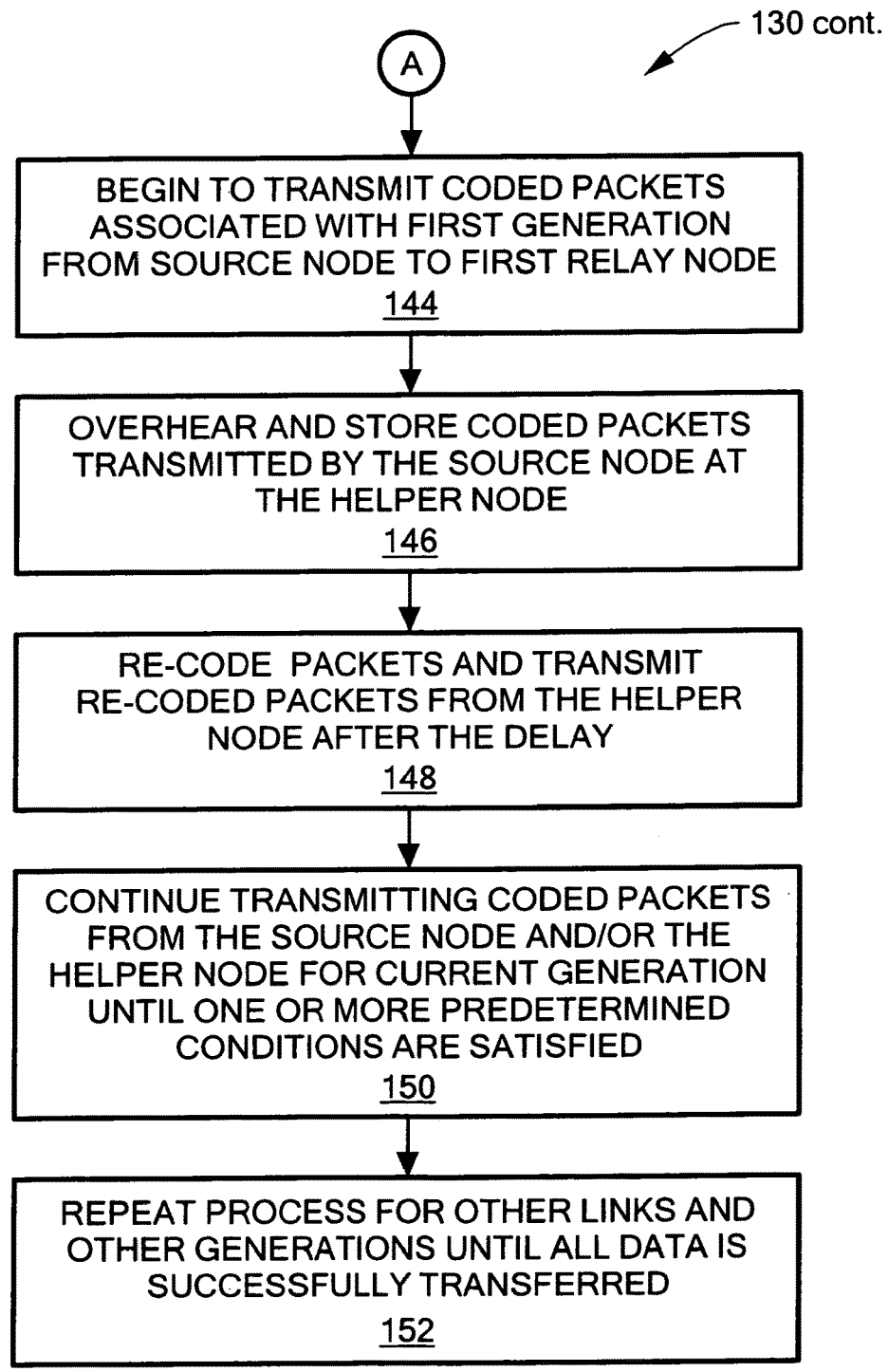

FIGS. 12A and 12B are portions of a flow diagram illustrating a process 130 for use in transferring data from a source node to a destination node in a wireless mesh network in accordance with an embodiment.

The rectangular elements (typified by element 132 in FIG. 12A) are herein denoted "processing blocks" and may represent computer software instructions or groups of instructions. It should be noted that the flow diagram of FIGS. 12A and 12B represents one exemplary embodiment of a design provided herein and variations in such a diagram, which generally follow the process outlined, are considered to be within the scope of the concepts, systems, techniques, circuits, and protocols described and claimed herein.

Alternatively, the processing blocks may represent operations performed by functionally equivalent circuits such as a digital signal processor circuit, an application specific integrated circuit (ASIC), or a field programmable gate array (FPGA). The flow diagram does not depict the syntax of any particular programming language. Rather, the flow diagram illustrates the functional information one of ordinary skill in the art requires to fabricate circuits and/or to generate computer software to perform the processing required of a particular apparatus or method. It should be noted that many routine program elements, such as initialization of loops and variables and the use of temporary variables are not shown. It will be appreciated by those of ordinary skill in the art that unless otherwise indicated herein, the particular sequence described is illustrative only and can be varied without departing from the spirit of the concepts described and/or claimed herein. Thus, unless otherwise stated, the processes described below are unordered meaning that, when possible, the actions shown in FIGS. 12A and 12B can be performed in any convenient or desirable order.

Referring now to FIG. 12A, data is first acquired at a source node of a wireless mesh network that needs to be transmitted to a destination node of the network (block 132). The acquired data may include, for example, a data file that needs to be delivered to a remote user. It should be appreciated that the data does not all have to be acquired at the same time. That is, in some embodiments, the data may be acquired over a period of time. A unicast route through the network from the source node to the destination node may then be determined (block 134). The route will typically include the source node, one or more relay nodes, and the destination node. Any routing technique or algorithm may be used to determine the unicast route (e.g., B.A.T.M.A.N., AODV, OLSR, DCR, etc.). For a link between the source node and a first relay node in the route, a helper node in the vicinity of the source node may be activated to assist the link (block 136). In some implementations, the helper node may be activated by direct request from the source node to the helper node. In other implementations, a helper node may decide automatically that it is to act as a helper for the link. In some implementations, a helper node will only be activated in response to a predetermined condition. For example, in some cases, a helper node may be activated for a link only if the quality of the link is below a certain threshold level. Thus, the source node may check available channel quality information (e.g., information generated by the routing algorithm, etc.) to determine whether to request a helper. Alternatively, a node that is close to the link may check channel quality information for the link to determine whether it should automatically act as a helper for the link. In some implementations, a helper node will always be activated, if available. At some point, the source node will divide the acquired data into groups based on the generation size (block 138). This may be performed all at the same time or the data may be divided into generations over a period of time (e.g., as it is acquired).

After a helper node has been activated, a delay value may be calculated to identify a time after which the helper node will begin transmitting re-coded packets to the first relay node (block 138). In at least one implementation, the delay value may be calculated as the number of packets (p) that the helper node must overhear from the source node (for the present generation) before it begins to transmit re-coded packets. Other techniques for defining the delay value may be used in other implementations (e.g., a predetermined time period may be specified in some implementations and a timer may be used to keep track of elapsed time, etc.). The delay value may be calculated based on, for example, known channel conditions in the network and/or active neighbor nodes or users in the network. Other criteria for calculating the delay value may also be considered (e.g., generation size, etc.). In at least one embodiment, a mean flow analysis may be used to determine a value of p using channel error probabilities. It should be appreciated that the helper node may begin to transmit re-coded packets after the delay period, but it does not necessarily transmit packets continuously after this point in time. That is, there may be one or more periods of non-transmission interspersed with periods of packet transmission after the helper begins to transmit.

The source node may then generate coded packets for a first generation and store the coded packets in a buffer (block 142). In some embodiments, coded packets will not be generated for a particular generation until all source data has been acquired for the generation. In other embodiments, coded packets may begin to be generated in the source node for a particular generation before all source data has been assembled for that generation. Before generating the coded packets for the first generation, the source node may estimate the number of the coded packets that it has to transmit directly to the first relay node. This estimation may be made based, at least in part, on channel conditions in the network. In at least one embodiment, Equation 4 discussed above may be used to calculate the number of coded packets. In at least one embodiment, the coded packets will be RLNC packets. After generation, the coded packets may be stored within a buffer in the MAC layer.

Turning now to FIG. 12B, the source node begins to transmit the coded packets associated with the first generation to the first relay node (block 144). In some embodiments, the source node may begin to transmit coded packets for the first generation before all packets have been accumulated for the generation. That is, it is not necessary for all of the packets associated with the first generation to be assembled before transmission begins. The helper node overhears the coded packets transmitted by the source node and stores the overheard packets in a local buffer (block 146). After the delay determined above, the helper node begins to transmit re-coded packets based on the stored overheard packets (block 148). The source node and the helper node may then continue to transmit coded packets until one or more predetermined conditions are satisfied (block 150). For example, the first relay node may be configured to transmit an ACK message when a sufficient number of DOFs have been received to decode the original data packets of the current generation. The source node and the helper node may be configured to cease transmitting coded packets for the current generation in response to the ACK packet. In some embodiments, the helper node will be instructed to only transmit a certain number of coded packets (k) for the current generation. Thus, the helper node may cease transmitting packets for the current generation after this number of coded packets have been transmitted.

In some embodiments, the source node may also have a specified number of coded packets to transmit to the first relay node for the current generation. In some embodiments, the source node may cease to transmit coded packets for the current generation after this number has been reached. In other embodiments, as described previously, the source node may be configured to continue to generate and transmit coded packets for the current generation until an ACK is received from the first relay node. In one approach, for example, the source node will generate and buffer additional coded packets for the current generation when the number of coded packets presently in the buffer reaches a predetermined number without having received an ACK packet. In another approach, the source node may generate and buffer additional coded packets for the current generation if a predetermined time period has elapsed without receiving am ACK packet. Other strategies for ensuring a sufficient number of DOFs are received by the first relay node may alternatively be used.

As described above in connection with block 148, the helper node will begin to transmit re-coded packets after the predetermined delay (e.g., after p coded packets have been overheard from the source node). In some implementations, the helper node will not generate all of the re-coded packets that it will transmit at the same time. Instead, a mechanism may be provided by which the helper node can spread out the generation of re-coded packets. In at least one embodiment, as described previously, a "budget" metric will be defined that can be used by the helper node to control the generation and transmission of re-coded packets. A similar metric may be used by the relay nodes within the route through the network to control the generation of re-coded packets.

Eventually, a sufficient number of DOFs will have been received by the first relay node. At this point, the source node and the helper node can begin to start processing the next generation. A similar process to that described above may then be used for the first generation within the next link in the established route. The process may then be repeated for all links and all generations until all of the original data has been successfully transferred to the destination node (block 152). As described previously, in some embodiments, two or more helper nodes may be activated to assist a single link in a unicast route. Also a secondary helper assisting a particular link may be configured to overhear and store packet transmissions of the primary helper in some systems.

In some embodiments, aspects and/or features described herein are implemented, at least in part, as computer instructions and/or data structures stored on a non-transitory machine-readable (e.g., computer readable) medium or media. Any type of non-transitory machine-readable medium may be used including, for example, floppy diskettes, hard disks, optical disks, compact disc read only memories (CD-ROMs), magneto-optical disks, read only memories (ROMs), random access memories (RAMs), erasable programmable ROMs (EPROMs), electrically erasable programmable ROMs (EEPROMs), magnetic or optical cards, flash memory, and/or other types of non-transitory media suitable for storing electronic instructions and/or data. As used herein, the terms "non-transitory machine-readable media," "non-transitory computer-readable media," and the like are not intended to encompass transitory signals per se (i.e., signals acting as a medium or media). However, these terms are not intended to exclude physical media such as volatile memory or RAM, where the data or instructions stored thereon is only temporarily stored, or stored in "transitory" fashion.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A machine implemented method for use in a wireless mesh network, the method comprising:
   acquiring data packets at a source node that need to be delivered to a remote destination node through the wireless mesh network;
   determining at least one route through the wireless mesh network from the source node to the destination node to support a data flow for the acquired data packets;
   for a link between the source node and a first relay node in a route, automatically activating, based on channel conditions within the network, a helper node to assist the link in transferring data from the source node to the first relay node;
   generating random linear network coded (RLNC) packets at the source node for a first group of original packets of the data flow;
   initiating transmission of RLNC packets from the source node to the first relay node for the first group of original packets;
   overhearing RLNC packets transmitted by the source node for the first group of original packets at the helper node;
   re-coding overheard RLNC packets at the helper node for the first group of original packets to create re-coded RLNC packets comprising linear combinations of the RLNC packets;
   determining a delay that corresponds to a determined amount of time, calculated via delay calculation circuitry, which the helper node will have to wait before transmitting re-coded versions of RLNC packets overheard from the source node and wherein calculating the delay is based, at least in part, on channel conditions in the wireless mesh network or other active users or nodes in the wireless mesh network;
   after the delay, initiating transmission of the re-coded RLNC packets from the helper node to the first relay node for the first group of original packets of the data flow; and
   continuing to transmit RLNC packets from at least one of the source node and the helper node until the first relay node has received a sufficient number of degrees-of-freedom (DOFs) to decode the first group of original packets.

2. The method of claim 1 further comprising:
   repeating generating, initiating transmission, and overhearing of RLNC packets, re-coding of overheard RLNC packets, initiating transmission of re-coded RLNC packets, and continuing for each subsequent group of original packets after the first group of original packets.

3. The method of claim 1, further comprising:
   for a second link between the first relay node and a second relay node in the route, activating a second helper node to assist the second link in transferring data from the first relay node to the second relay node;
   generating re-coded RLNC packets at the first relay node for the first group of original packets; initiating transmission of re-coded RLNC packets from the first relay node to the second relay node for the first group of original packets;
   overhearing RLNC packets or linear combinations thereof transmitted by the first relay node for the first group of original packets at the second helper node;
   re-coding overheard RLNC packets at the second helper node for the first group of original packets;
   after a second delay, initiating transmission of re-coded RLNC packets from the second helper node to the second relay node for the first group of original packets; and
   continuing to transmit RLNC packets from at least one of the first relay node and the second helper node until the second relay node has received a sufficient number of degrees-of-freedom (DOFs) to decode the first group of original packets.

4. The method of claim 3, wherein: generating re-coded RLNC packets at the first relay node for the first group of original packets includes using a variable parameter to control timing of re-coding operations in the first relay node.

5. The method of claim 1,
   wherein: the delay of the helper node is expressed as a number of RLNC packets that the helper node has to overhear from the source node before initiating transmission of re-coded RLNC packets.

6. The method of claim 1, further comprising:
   estimating, at the source node, a number of RLNC packets that will need to be transmitted from the source node for the first group of original packets, wherein generating RLNC packets includes generating the estimated number of packets.

7. The method of claim 1, further comprising:
estimating a number of re-coded packets that will be transmitted from the helper node for the first group of original packets.

8. The method of claim 1, further comprising:
transmitting an ACK message from the first relay node after the first relay node has received the sufficient number of DOFs to decode the first group of original packets, wherein at least one of the source node and the helper node will cease to transmit RLNC packets for the first group of original packets in response to the ACK message.

9. The method of claim 1, wherein: re-coding overheard RLNC packets at the helper node for the first group of original packets includes using a variable parameter to control timing of re-coding operations and/or transmissions in the helper node.

10. The method of claim 1, further comprising: at a helper node associated with one link in the route, overhearing packets or linear combinations thereof transmitted by a helper node associated with another, different link in the route.

11. A machine implemented method for use in a wireless mesh network, the method comprising:
acquiring a group of data packets at a first wireless node for transmission to a second wireless node via a direct wireless link;
automatically activating, based on channel conditions within the network, a helper node to assist in transmission of data from the first wireless node to the second wireless node;
generating random linear network coded (RLNC) packets at the first wireless node by linearly combining the group of data packets;
initiating transmission of the RLNC packets from the first wireless node to the second wireless node through the direct wireless link;
overhearing RLNC packets or linear combinations thereof transmitted by the first wireless node at the helper node;
re-coding overheard RLNC packets within the helper node to generate re-coded RLNC packets comprising linear combinations of the overheard RLNC packets;
after a determined finite delay, initiating transmission of re-coded RLNC packets from the helper node to the second wireless node;
wherein the determined finite delay corresponds to a determined amount of time calculated, via delay calculation circuitry, which the helper node will have to wait before transmitting re-coded versions of RLNC packets overheard from the first wireless node and wherein the calculated delay is based, at least in part, on channel conditions in the wireless mesh network or other active users or nodes in the wireless mesh network; and
continuing to transmit RLNC packets from at least one of the first wireless node and the helper node until the second wireless node has received a sufficient number of degrees-of-freedom (DOFs) to decode the group of data packets.

12. The method of claim 11, wherein: automatically activating a helper node includes determining at the first wireless node that a helper node is needed and sending a request to another node in the wireless mesh network requesting that the other node serve as a helper node for the link between the first wireless node and the second wireless node.

13. The method of claim 11, wherein: calculating the delay of the helper node is performed at either the first wireless node or the helper node.

14. The method of claim 11, wherein: the delay of the helper node is expressed as a number of RLNC packets that the helper node has to overhear from the source node before transmission of re-coded RLNC packets is initiated.

15. The method of claim 11, further comprising: transmitting an ACK message from the second wireless node after the second wireless node has received the sufficient number of DOFs to decode the group of data packets, wherein at least one of the first wireless node and the helper node will cease to transmit RLNC packets associated with the group of data packets in response to the ACK message.

16. The method of claim 11, wherein: activating a helper node to assist in transmission of data from the first wireless node to the second wireless node includes activating a first helper node; and the method further comprises activating at least one additional helper node to assist in transmission of data from the first wireless node to the second wireless node.

17. The method of claim 16, wherein: the at least one additional helper node includes a secondary helper node that is configured to overhear RLNC packets transmitted by the first helper node.

18. The method of claim 11, wherein: the group of data packets is representative of a single group of original packets of a data transfer between a source node and a destination node via a route that includes the first and second wireless nodes.

19. The method of claim 11, wherein: the group of data packets includes RLNC packets; and generating RLNC packets at the first wireless node includes re-coding RLNC packets in the group of data packets.

* * * * *